United States Patent
Misawa et al.

(10) Patent No.: US 8,954,845 B2
(45) Date of Patent: Feb. 10, 2015

(54) IMAGE PROCESSING DEVICE, METHOD AND STORAGE MEDIUM FOR TWO-WAY LINKING BETWEEN RELATED GRAPHICS AND TEXT IN AN ELECTRONIC DOCUMENT

(75) Inventors: Reiji Misawa, Tokyo (JP); Ryo Kosaka, Tokyo (JP); Tomotoshi Kanatsu, Tokyo (JP); Hidetomo Sohma, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 222 days.

(21) Appl. No.: 13/074,071

(22) Filed: Mar. 29, 2011

(65) Prior Publication Data
US 2011/0252315 A1 Oct. 13, 2011

(30) Foreign Application Priority Data
Apr. 7, 2010 (JP) .................. 2010-088657

(51) Int. Cl.
G06F 17/00 (2006.01)
G06F 17/24 (2006.01)
G06F 17/22 (2006.01)
G06F 17/30 (2006.01)
G06K 9/00 (2006.01)

(52) U.S. Cl.
CPC .......... *G06F 17/241* (2013.01); *G06F 17/2235* (2013.01); *G06F 17/30253* (2013.01); *G06K 9/00456* (2013.01); *G06K 9/00476* (2013.01)
USPC ............ 715/256; 715/243; 715/266; 715/204

(58) Field of Classification Search
USPC .................. 715/243, 244, 246, 253, 204, 266
See application file for complete search history.

(56) References Cited

U.S. PATENT DOCUMENTS

| 5,204,947 | A | * | 4/1993 | Bernstein et al. ............. 715/854 |
| 5,832,476 | A | * | 11/1998 | Tada et al. ..................... 707/723 |
| 5,892,843 | A | * | 4/1999 | Zhou et al. ................... 382/176 |
| 6,178,434 | B1 | * | 1/2001 | Saitoh .......................... 715/234 |
| 6,353,840 | B2 | | 3/2002 | Saito et al. |
| 7,170,647 | B2 | | 1/2007 | Kanatsu |
| 7,287,222 | B2 | | 10/2007 | Takata et al. |

(Continued)

FOREIGN PATENT DOCUMENTS

| CN | 1677435 A | 10/2005 |
| JP | H11-066196 | 3/1999 |
| JP | 2005-135164 A | 5/2005 |

OTHER PUBLICATIONS

Office Action issued on Aug. 31, 2012, in counterpart CN application No. 201110083039.0.

*Primary Examiner* — Chau Nguyen
*Assistant Examiner* — Howard Cortes
(74) *Attorney, Agent, or Firm* — Fitzpatrick, Cella, Harper & Scinto

(57) ABSTRACT

A region division portion extracts an "object", an "anchor expression accompanying the object" and a "text including the anchor expression" from image data based on a paper document and an electronic document. A link processing portion generates link information that associates, in two ways, the "object", the "anchor expression included in the text" or the "text including the anchor expression" with each other. Then, a format conversion portion converts the link information into electronic document data including two-way link information. When this electronic document data is displayed by an application and one of the "object" and the "anchor expression included in the text" is selected, the other can be displayed according to the link information.

10 Claims, 24 Drawing Sheets

(56) References Cited

U.S. PATENT DOCUMENTS

| | | |
|---|---|---|
| 7,298,900 B2 | 11/2007 | Kanatsu |
| 7,340,092 B2 * | 3/2008 | Tanaka et al. ............... 382/170 |
| 7,382,939 B2 | 6/2008 | Kanatsu |
| 7,715,625 B2 | 5/2010 | Tagawa et al. |
| 7,965,892 B2 | 6/2011 | Kanatsu |
| 2001/0042083 A1 | 11/2001 | Saito et al. |
| 2005/0027745 A1 | 2/2005 | Sohma et al. |
| 2005/0232484 A1 * | 10/2005 | Tagawa et al. ............... 382/173 |
| 2007/0047813 A1 * | 3/2007 | Simske et al. ............... 382/176 |
| 2007/0118794 A1 * | 5/2007 | Hollander et al. ............ 715/512 |
| 2008/0080769 A1 | 4/2008 | Kanatsu |
| 2009/0290192 A1 | 11/2009 | Kosaka |
| 2009/0324065 A1 * | 12/2009 | Ishida et al. ................. 382/164 |
| 2009/0324080 A1 | 12/2009 | Yamazaki et al. |

* cited by examiner

| | ATTRIBUTE | REGION ACCOMPANIED BY CAPTION | COORDINATE X | COORDINATE Y | WIDTH W | HEIGHT H | PAGE | CHARACTER INFORMATION | NAME |
|---|---|---|---|---|---|---|---|---|---|
| REGION 501 | HEADING | — | X1 | Y1 | W1 | H1 | 1 | SAMPLE | HEADING REGION |
| REGION 502 | TABLE | — | X2 | Y2 | W2 | H2 | 1 | — | TABLE REGION |
| REGION 503 | PHOTOGRAPH | — | X3 | Y3 | W3 | H3 | 1 | — | OBJECT |
| REGION 504 | CHARACTER (503 WITHIN PHOTOGRAPH) | — | X4 | Y4 | W4 | H4 | 1 | NEW PRODUCT | CHARACTER REGION WITHIN PHOTOGRAPH |
| REGION 505 | CAPTION | 503 | X5 | Y5 | W5 | H5 | 1 | FIG. 1 AAA | CAPTION REGION |
| REGION 506 | TEXT | — | X6 | Y6 | W6 | H6 | 1 | ..FIG. 1 RELATES TO AAA... | TEXT REGION |

FIG.5B

| ATTRIBUTE | CHARACTER | PHOTOGRAPH | LINE FIGURE | TABLE |
|---|---|---|---|---|
| CONVERSION PROCESSING | VECTOR CONVERSION | IMAGE CLIPPING | VECTOR CONVERSION | VECTOR CONVERSION (TABLE FRAME PORTION) |
| DELETION PROCESSING | PRESENT | PRESENT | PRESENT | PRESENT |

FIG.5C

```
<?xml version="1.0" ?>
<svg xmlns="http://www.w3.org/2000/svg" width="2480" height="3520"
    xmns:x="http://@@@.jp">

<text x="X1" y="Y1" color="#000000">SAMPLE</text>

<g>
 <path stroke="#000000" d="M X4,Y4 L···" />
 ……
</g>

<g x:link id="image_01">
  <rect x="X3" y="Y3" width="W3" height="H3"
  onclick = [
      var field = this.getField("text_01");
      field.strokeColor=color.red;
      field.setFocus();
  ]
  />
</g>

<g x:link id="text_01">
  <rect x="X7" y="Y7" width="W7" height="H7"
  onclick = [
      var field = this.getField("image_01");
      field.strokeColor=color.red;
      field.setFocus();
  ]
  />
</g>

<image x="X3" y="Y3" width="W3" height="H3"
    xlink:href="data:image/png;base64,Dez3632fsod6Xhd0dsc4d ……." />
    ……

<text x="X4" y="Y4" color="#000000">NEW PRODUCT </text>

<text x="X5" y="Y5" color="#000000">FIG. 1 AAA </text>

<text x="X6" y="Y6" color="#000000">···.FIG. 1 RELATES TO AAA···.···</text>

</svg>
```

FIG.6

| | ATTRIBUTE | REGION ACCOMPANIED BY CAPTION | COORDINATE X | COORDINATE Y | WIDTH W | HEIGHT H | PAGE | CHARACTER INFORMATION | ANCHOR EXPRESSION | LINK IDENTIFIER |
|---|---|---|---|---|---|---|---|---|---|---|
| REGION 908 | TEXT | — | X08 | Y08 | W08 | H08 | 1 | ··CAMERA AAA (FIG. 1) IS··· | FIG. 1 | text_01 |
| REGION 910 | TEXT | — | X10 | Y10 | W10 | H10 | 2 | ······ | — | — |
| REGION 911 | PHOTOGRAPH | — | X11 | Y11 | W11 | H11 | 3 | — | — | image_01 |
| REGION 912 | CAPTION | 911 | X12 | Y12 | W12 | H12 | 3 | FIG. 1 AAA | FIG. 1 | — |
| REGION 913 | TEXT | — | X13 | Y13 | W13 | H13 | 4 | ······ | — | — |

FIG.9B

| LINK IDENTIFIER | GRAPHIC DATA | ACTION OF READER | ACTION OF APPLICATION | COLOR |
|---|---|---|---|---|
| text_01 | ("COORDINATE X", "COORDINATE Y", "WIDTH W", "HEIGHT H")<br>=("X14","Y14","W14","H14") | CLICK | MOVEMENT TO LINKED DESTINATION (image_01) | RED |
| image_01 | ("COORDINATE X", "COORDINATE Y", "WIDTH W", "HEIGHT H")<br>=("X15","Y15","W15","H15") | CLICK | MOVEMENT TO LINKED DESTINATION (text_01) | RED |

914 (text_01 row), 915 (image_01 row)

FIG.9C

| | ATTRIBUTE | REGION ACCOMPANIED BY CAPTION | COORDINATE X | COORDINATE Y | WIDTH W | HEIGHT H | PAGE | CHARACTER INFORMATION | ANCHOR EXPRESSION | LINK IDENTIFIER |
|---|---|---|---|---|---|---|---|---|---|---|
| REGION 1208 | TEXT | — | X08 | Y08 | W08 | H08 | 1 | ..CAMERA AAA (FIG. 1) IS... | FIG. 1 | text_01 |
| REGION 1210 | TEXT | — | X10 | Y10 | W10 | H10 | 2 | ......OF FIG. 1 | FIG. 1 | text_02 |
| REGION 1211 | PHOTOGRAPH | — | X11 | Y11 | W11 | H11 | 3 | — | — | image_01 |
| REGION 1212 | CAPTION | 1211 | X12 | Y12 | W12 | H12 | 3 | FIG. 1 AAA | FIG. 1 | — |
| REGION 1213 | TEXT | — | X13 | Y13 | W13 | H13 | 4 | FIG. 1 IS ALSO... | FIG. 1 | text_03 |

FIG.12B

| LINK IDENTIFIER | GRAPHIC DATA | ACTION OF READER | ACTION OF APPLICATION | COLOR |
|---|---|---|---|---|
| text_01 | ("COORDINATE X", "COORDINATE Y", "WIDTH W", "HEIGHT H") = ("X14", "Y14", "W14", "H14") | CLICK | MOVEMENT TO LINKED DESTINATION (image_01) | RED |
| text_02 | ("COORDINATE X", "COORDINATE Y", "WIDTH W", "HEIGHT H") = ("X16", "Y16", "W16", "H16") | CLICK | MOVEMENT TO LINKED DESTINATION (image_01) | RED |
| text_03 | ("COORDINATE X", "COORDINATE Y", "WIDTH W", "HEIGHT H") = ("X17", "Y17", "W17", "H17") | CLICK | MOVEMENT TO LINKED DESTINATION (image_01) | RED |
| image_01 | ("COORDINATE X", "COORDINATE Y", "WIDTH W", "HEIGHT H") = ("X15", "Y15", "W15", "H15") | CLICK | LIST DISPLAY | — |

(rows labeled 1216, 1217, 1218, 1219)

FIG.12C

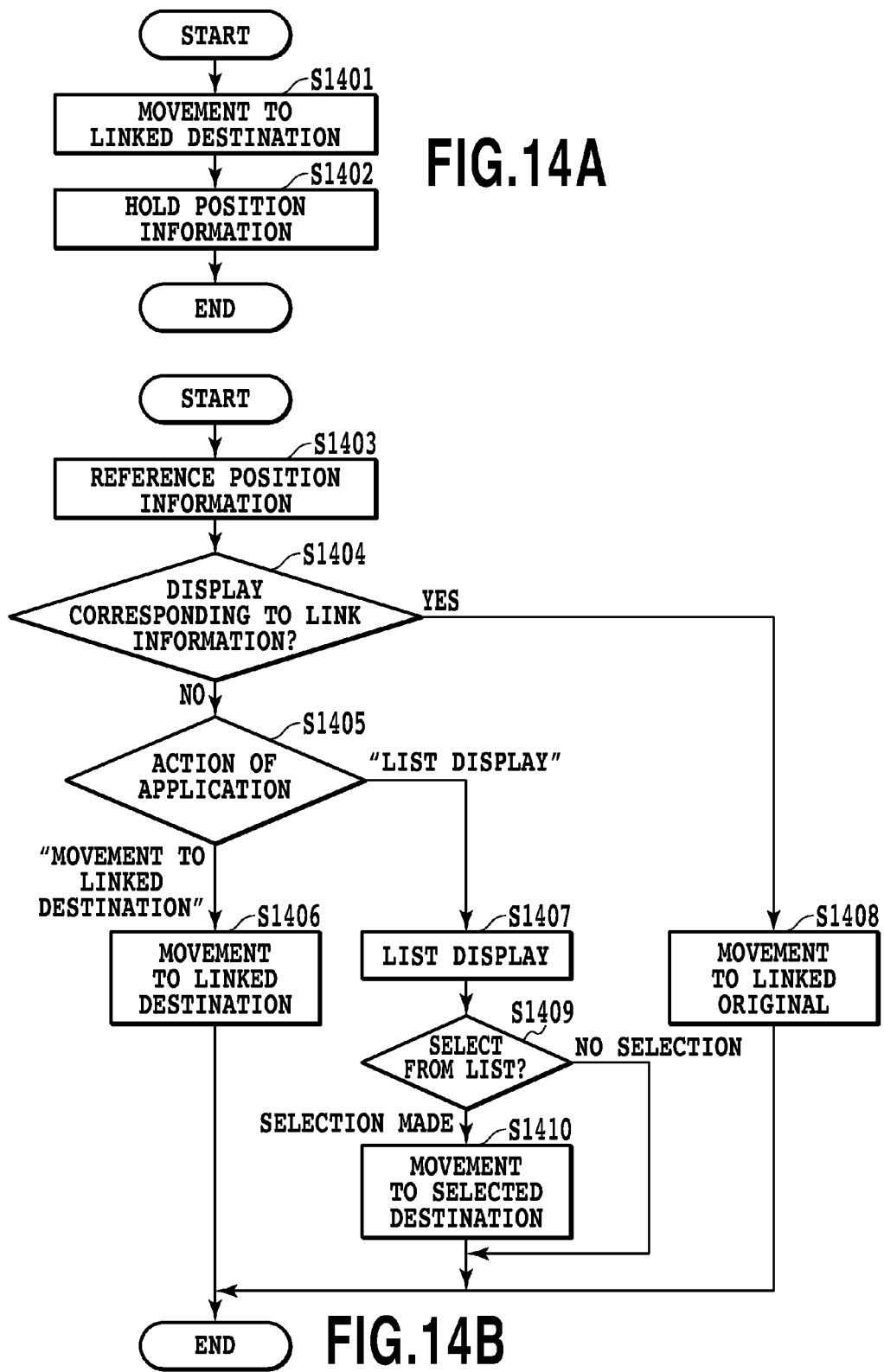

IMAGE PROCESSING DEVICE, METHOD AND STORAGE MEDIUM FOR TWO-WAY LINKING BETWEEN RELATED GRAPHICS AND TEXT IN AN ELECTRONIC DOCUMENT

BACKGROUND OF THE INVENTION

1. Field of the Invention

The present invention relates to an image processing device and an image processing method that generate electronic document data including two-way link information from a paper document or electronic document data.

2. Description of the Related Art

In general, a paper document and an electronic document include characters, graphics and the like. For example, there is a paper document, an electronic document or the like that includes an "object" (region 1614), an "anchor expression accompanying the object (for example, an expression such as a "figure number", "Figure 1" or "FIG. 1")" (region 1612) and a "text including the anchor expression" (region 1613) shown in FIG. 16A. Specifically, examples of this type of document include an academic paper, a patent document, an instruction manual and a product catalogue. Here, the "object" in the present specification refers to a region of a "figure", a "photograph", an "illustration" or the like included in a document. The "text including the anchor expression" refers to a text including sentences that describe or explain the "object". The "anchor expression" refers to, for example, characters (such as a figure number) for recognizing the object like "Figure 1" included in the region 1611. In the following explanation, the "text including the anchor expression" is referred to as a "description text for the object". As described above, when the document includes the "object", a reader of the document needs to read the document with consideration given to a two-way correspondence relationship between the "object" and the "description text for the object".

However, when the reader has difficulty in grasping the correspondence relationship between the "object" and the "description text for the object" in a document, the reader needs much time to read it to understand correctly. The reader needs extra time to understand the content of the document. Here, as an example of a paper document in which the correspondence relationship between the "object" and the "description text for the object" is difficult to grasp, an example of FIG. 16B will be explained. FIG. 16B shows an example where a paper document composed of N pages, that is, pages 1 to N (N: an integer), separately has a page of the "object" and a page of the "description text for the object". A region 1604 is an "object", a region 1605 is a "caption accompanying the object", a region 1606 is an "anchor expression in the caption" and a region 1602 is an "anchor expression in a text". A region 1601 is a "text including anchor expression", that is, a "description text for the object", and regions 1603 are the other texts. In general, when the reader of the document reads the text within the region 1601 on page 1, the reader searches another page including the object indicated by the "anchor expression in the text" in the region 1602 ("FIG. 1" shown in FIG. 16B). Then, the reader searches the region 1606 on page N, and after reading the regions 1604 and 1605, the reader returns to page 1 and reads sentences in the text following the region 1602. By contrast, when the reader first sees page N, the reader searches for a portion of the text including an "anchor expression in a caption" like the region 1606 (here, "FIG. 1"). As described above, the reader searches the region 1602 on page 1, reads the text including the "FIG. 1" that is an anchor expression, and thereafter returns to page N. As described above, when the paper document is used in which it is difficult to grasp the correspondence relationship between the "object" and the "description text for the object", the reader manually turns pages to the corresponding page, and searches for a position (what page, what paragraph and what line) where the "object" or the "description text for the object" is described. It takes much time to do this. Then, it is time-consuming to read what is described in the searched position and thereafter return to the original position on the original page. On the other hand, when an electronic document is used, it is necessary to search for the position where the "object" or the "description text for the object" is described using the page scrolling function and the search function of application in a personal computer (hereinafter, a PC), and this is also a time-consuming operation. It is also time-consuming to read its content and thereafter return to the original position on the original page. An example shown in FIG. 16B indicates that, in a document composed of N pages, that is, pages 1 to N, one "object" and one "description text for the object" are present in each of the N pages. Needless to say, as the number of pages, the number of "objects" and the number of "description texts for the objects" are increased, it becomes more time-consuming. Another example of the document in which the correspondence relationship between the "object" and the "description text for the object" is difficult to grasp is shown in FIG. 16C. In FIG. 16C, although the "object" and the "description text for the object" are on the same page, they are located apart from each other.

As described above, in the document in which the correspondence relationship between the "object" and the "description text for the object" is difficult to grasp, the reader of such a document disadvantageously takes much time to read it, and also takes an extra time to understand the content of the document.

To overcome the problem, Japanese Patent Laid-Open No. H11-066196(1999) discloses an invention in which a paper document is optically read and a document that can be utilized in various computers corresponding to utilization purposes can be generated. Specifically, an electronic document is generated by producing hypertext on figures and figure numbers. Then, the "figure number" in the text is clicked with a mouse or the like, and thus it is possible to display a figure corresponding to the "figure number" on a screen.

However, in Japanese Patent Laid-Open No. H11-066196 (1999), link information from an "anchor expression in a text" to an "object" is generated whereas link information, in the opposite way, from the "object" to the "anchor expression in the text" or to a "description text for the object" is not generated. Thus, it is time-consuming to search the "description text for the object" from the "object".

It is also time-consuming for the reader to first read the "description text for the object" and reference the "anchor expression in the text" to find the "object" and thereafter return to the "description text for the object" that has been immediately previously read. In other words, it is time-consuming to search for the position (what page, what paragraph and what line) of the "description text for the object".

SUMMARY OF THE INVENTION

To overcome the foregoing problems, an image processing device according to the present invention includes: an input unit configured to input document image data; a region division unit configured to divide the document image data into a plurality of regions according to attributes, the divided regions including a text region, a caption region and an object region which is accompanied by the caption region; a character recognition unit configured to obtain character information by executing character recognition process for each character within each of the text region and the caption region divided by the region division unit; an anchor expression extraction unit configured to extract, from the character information in the caption region, an anchor expression which includes a predetermined character string identifying the object region; a text search unit configured to search for the anchor expression extracted by the anchor expression extraction unit from the character information in the text region; a link information generation unit configured to generate two-way link information associating an anchor expression peripheral region and an image peripheral region with each other, the anchor expression peripheral region being a region including the anchor expression for which the text search unit searches in the text region, the image peripheral region being a region including the object region; and a format conversion unit configured to generate electronic document data including document image data and the two-way link information.

In the present invention, electronic document data that is a feature of the present invention and that includes two-way link information is automatically produced between an "object" and a "description text for the object", and thus the following effects can be obtained. When a reader reads a "text including an anchor expression", that is, the "description text for the object" and searches for the corresponding "object", it is possible to display the "object" with a simple operation.

Further features of the present invention will become apparent from the following description of exemplary embodiments (with reference to the attached drawings).

BRIEF DESCRIPTION OF THE DRAWINGS

FIG. 5B shows various types of data generated by the data processing portion;

FIG. 5C shows a corresponding table;

FIG. 6 shows an example of electronic document data on input image data used in the present invention;

FIG. 9B shows various types of data generated by a data processing portion in the first embodiment;

FIG. 9C shows link information in the first embodiment;

FIG. 12B shows various types of data generated by a data processing portion in the second embodiment;

FIG. 12C shows link information and candidate display information in the second embodiment;

FIG. 14A shows a flowchart when an anchor expression peripheral region is clicked in the second embodiment;

FIG. 14B shows a flowchart when an image peripheral region is clicked in the second embodiment;

DESCRIPTION OF THE EMBODIMENTS

Preferred embodiments of the present invention will be explained below with reference to drawings.

First Embodiment

Figure 1:
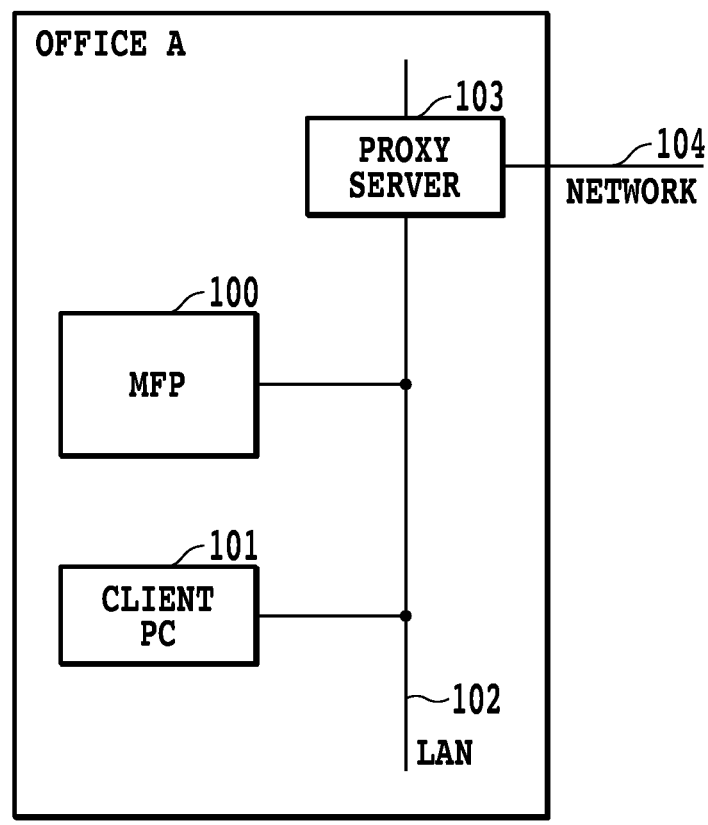
FIG. 1 is a block diagram showing an image processing system of the present invention.

FIG. 1 is a block diagram showing the configuration of an image processing system of the present embodiment.

In FIG. 1, an MFP (multi function peripheral) 100 that is a composite machine having a plurality of functions (copying function, print function, transmission function and the like) is connected to a LAN 102 constructed in an office A. The LAN 102 is also connected to a network 104 through a proxy server 103. A client PC 101 receives transmission data from the MFP 100 through the LAN 102, and can utilize the functions of the MFP 100. For example, the client PC 101 transmits print data to the MFP 100 and thereby can print a print material with the MFP 100 based on the print data. The configuration of FIG. 1 is an example, and a plurality of offices having the same constituent elements as the office A may be connected to the network 104. The network 104 is a typical communication network that is achieved by the Internet, a LAN, a WAN, a telephone line, a dedicated digital line, an ATM, a frame relay line, a communication satellite channel, a cable television line, a data broadcast radio channel and the like. Any network may be used as long as it can transmit and receive data. Various terminals of the client PC 101 and the proxy server 103 have standard constituent elements that are installed in a general-purpose computer. For example, they have a CPU, a RAM, a ROM, a hard disk, an external storage device, a network interface, a display a keyboard, a mouse and the like.

Figure 2:
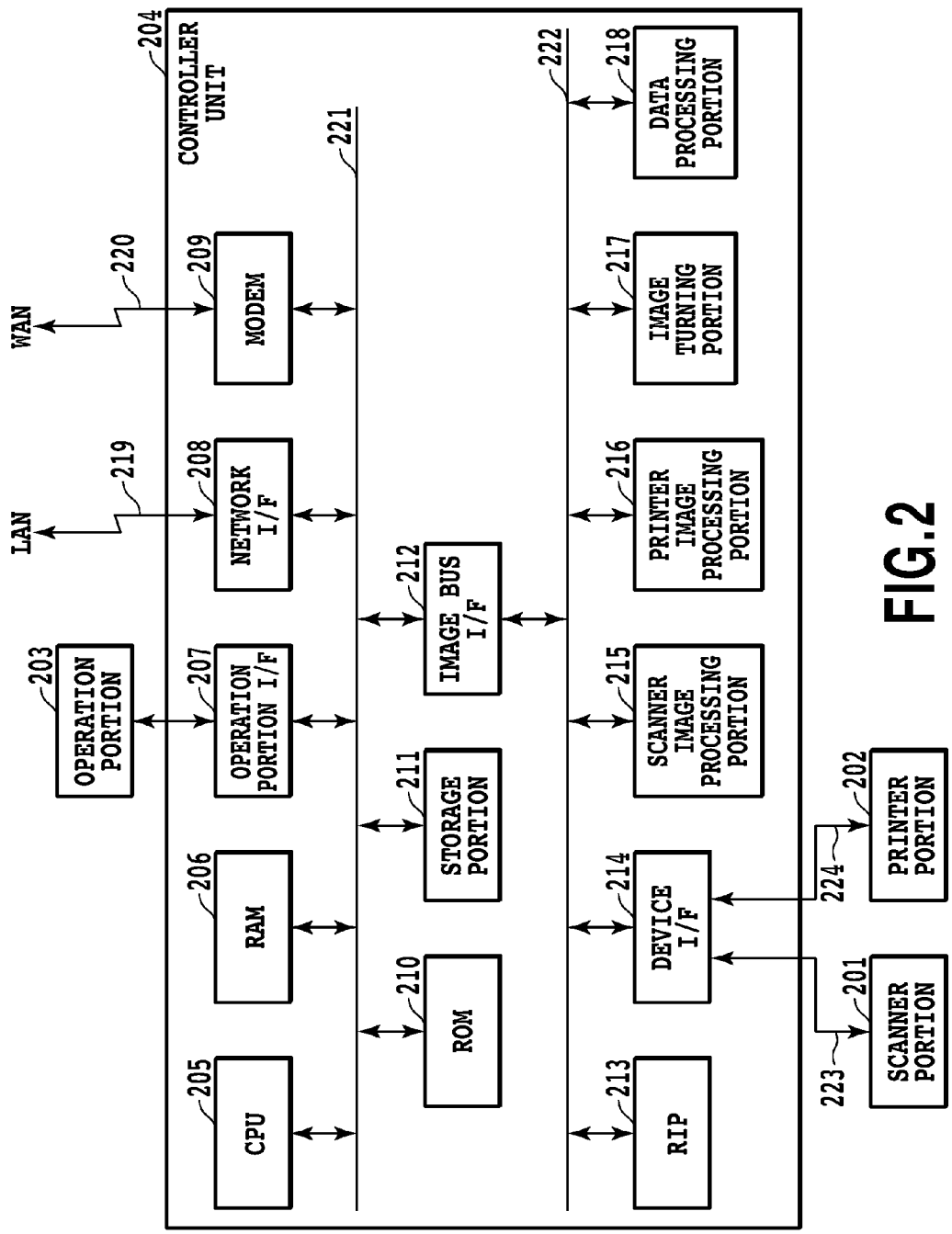
FIG. 2 is a block diagram showing an example of the configuration of an MFP 100.

FIG. 2 is a diagram showing the detailed configuration of the MFP 100 that is an image processing machine of the present embodiment. The MFP 100 shown in FIG. 2 has a scanner portion 201 that is an image input device, a printer portion 202 that is an image output device, a control unit 204 that includes a CPU 205 and the like, an operation portion 203 that is a user interface and the like. The control unit 204 is connected to the scanner portion 201, the printer portion 202, and the operation portion 203; on the other hand, the control unit 204 is a controller that inputs and outputs image information and device information when it is connected to a LAN 219 and a public line (WAN) 220 which is a common telephone line. The CPU 205 controls units included in the control unit 204. A RAM 206 is a system work memory for operating the CPU 205, and is also an image memory for temporarily storing image data. A ROM 210 is a boot ROM where programs such as a boot program of a system are stored. A storage portion 211 is a hard disk drive that stores system control software and image data. An operation portion I/F 207 is an interface portion to the operation portion (UI) 203 that outputs to the operation portion 203 image data to be displayed on the operation portion 203. The operation portion I/F 207 also functions to transmit to the CPU 205 information that is input with the operation portion 203 by a user of the image processing device. A network I/F 208 connects the image processing device to the LAN 219, and inputs and outputs information of packet format. A modem 209 connects the image processing device to the WAN 220, and demodulates and modulates data to input and output information. The devices described above are arranged on a system bus 221.

An image bus I/F 212 is a bus bridge that connects the system bus 221 and an image bus 222 which transfers image data at a high speed, and that changes a data structure. The image bus 222 is formed with, for example, a PCI bus or an IEEE 1394 bus. On the image bus 222, the following devices are arranged. A raster image processor (RIP) 213 analyzes a PDL (page description language) code and expands it to a bit map image having a specified resolution, that is, achieves so-called rendering processing. When this expansion is performed, attribute information is added in units of pixels or in units of regions. This is called image region determination processing. The image region determination processing is performed to add attribute information indicating objects such as characters (text) and lines, graphics and images for each pixel or each region. For example, an image region signal is output from the RIP 213 according to the type of object of PDL description within a PDL code, and attribute information corresponding to an attribute indicated by its signal value is stored such that it is associated with a pixel or a region corresponding to the object. Hence, the image data includes the associated attribute information. A device I/F 214 connects the scanner portion 201 that is an image input device to the control unit 204 through a signal line 223, and connects the printer portion 202 that is an image output device to the control unit 204 through a signal line 224, and thereby changes the synchronous system/asynchronous system of image data. A scanner image processing portion 215 corrects, processes and edits input image data. A printer image processing portion 216 performs correction, resolution change and the like corresponding to the printer portion 202 on print output image data that needs to be output to the printer portion 202. An image turning portion 217 turns image data that has been input to erect the image data, and outputs it. A data processing portion 218 will be described later.

Figure 3:
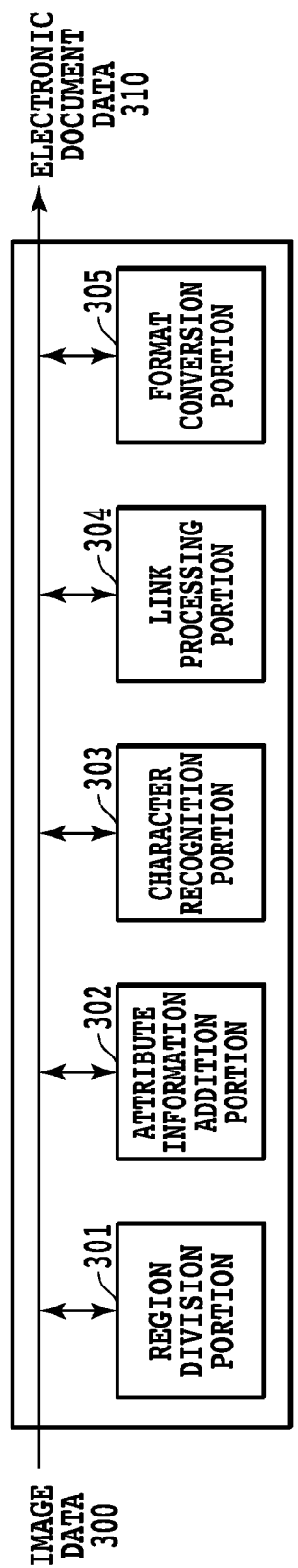
FIG. 3 is a block diagram showing an example of the configuration of a data processing portion 218.

The configuration and operation of the data processing portion 218 shown in FIG. 2 will now be described with reference to FIG. 3. The data processing portion 218 includes a region division portion 301, an attribute information addition portion 302, a character recognition portion 303, a link processing portion 304 and a format conversion portion 305. For example, the data processing portion 218, when receiving image data 300 scanned by the scanner portion 201, performs processing at individual processing portions 301 to 305 to generate and output electronic document data 310.

The image data scanned by the scanner portion 201 shown in FIG. 2 or the image data (document image) stored in the storage portion 211 are input to the region division portion 301. The region division portion 301 then divides the input image data into individual regions such as characters, a photograph, a figure and a table arranged within a page.

In this case, a known method can be used as a region division method. An example thereof will be explained. An input image is first binarized to generate a binary image, and the resolution of the binary image is reduced to generate a thinned-out image (reduced image). For example, when a 1/(M×N) thinned-out image is produced, the binary image is divided for every M×N pixels, and, if a black pixel is present within the M×N pixels, the corresponding pixel after reduction is set to a black pixel whereas, if a black pixel is not present, the corresponding pixel is set to a white pixel, and thus the thinned-out image is produced. Then, in the thinned-out image, a portion (coupled black pixel) coupled to a black pixel is extracted to produce a rectangle circumscribing the coupled black pixel. When rectangles (rectangle of one character) close to a character image size are arranged side by side, or when either a vertical or horizontal one is a rectangle (a rectangle of the coupled black pixel where a few characters are connected) close to a character image size and the similar rectangles are arranged near a short side, it is highly likely to be a character image constituting one character string. In this case, the rectangles are coupled with each other, and thus a rectangle representing one character string is obtained. Since a group of rectangles representing one character string whose short sides have substantially the same length and which are spaced substantially regularly in a column direction is highly likely to be a text portion, they are coupled and a text region is extracted. A photograph region, a figure region and a table region are extracted by a coupled black pixel that is larger in size than a character image. Consequently, they are divided into, for example, regions 501 to 506 shown in FIG. 5A. As described later, the attribute of each region is determined based on its size, a horizontal to vertical ratio, a black pixel density, a result obtained by tracking the outline of a white pixel included in the coupled black pixel and the like. The divided regions are stored as region information in the storage portion 211.

The attribute information addition portion 302 adds an attribute to each of the regions obtained by division by the region division portion 301. The processing operation of the attribute information addition portion 302 will now be explained using, as an example, input image data 500 shown in FIG. 5A. Since a region 506 is composed of continuous character strings so as to have certain numbers of characters and lines within the page and the forms of the numbers of characters and lines, paragraphs and the like, the attribute information addition portion 302 adds a "text" attribute to the region 506. Whether or not the remaining regions include a rectangle close to a character image size is first determined. Since, in particular, a rectangle of a character image periodically appears within a region that includes a character image, it is possible to determine whether or not a character is included in the region. Consequently, the attribute information addition portion 302 regards the regions 501, 504 and 505 as regions including a character and adds a "character" attribute to these regions. Since these regions do not have the forms of the numbers of characters and lines, paragraphs and the like, they differ from the text region.

On the other hand, when the other regions are extremely small in size, the attribute information addition portion 302 determines the regions to be "noise". When the attribute information addition portion 302 performs white pixel outline tracking on the interior of the coupled black pixel having a small pixel density and rectangles circumscribing the white pixel outline are regularly arranged, the attribute information addition portion 302 determines the regions to be "tables" whereas when they are not regularly arranged, it determines the regions to be "line figure (figure)". The other regions having a high pixel density are determined to be pictures or photographs, and a "photograph" attribute is added to them. The regions to which the attributes of the "table", the "line figure" and the "photograph" are added correspond to the "object" described above, and are characterized in that they have attributes other than characters. Furthermore, when the character region determined not to be a text is present in the vicinity of (for example, above or below the region) the regions to which the attributes of the "table", the "line figure" and the "photograph" are added, the attribute information addition portion 302 determines it to be a character region that describes the regions of the "table", the "line figure" and the "photograph". Then, the attribute information addition portion 302 adds a "caption" attribute to the region. The region to which the "caption" attribute is added and the region accompanying the "caption" are stored in the region to which the "caption" attribute is added, such that they are associated with each other in order to identify the region (the objects of the "table", the "line figure" and the "photograph") accompanying the "caption". Specifically, as shown in FIG. 5B, in the region 505 (caption region), an item of the "region accompanying the caption" is associated with the "region 503". The attribute information addition portion 302 adds a "heading" attribute to a region that is larger than the character image of the text portion and that is arranged in a position different from the column of the text portion. The attribute information addition portion 302 adds a "small heading" attribute to a region that is larger than the character image of the text region and that is present in an upper portion of the column of the text region. Moreover, the attribute information addition portion 302 adds a "page" (or a "page header" or "page footer") attribute to a region that is present in a lower end portion or an upper end portion of a page composed of character images smaller in size than the character image of the text region and constituting image data. The attribute information addition portion 302 adds a "character" attribute to a region that is determined to be a character region but does not correspond to any of the "text", the "heading", the "small heading", the "caption" and the "page".

Figure 5A:
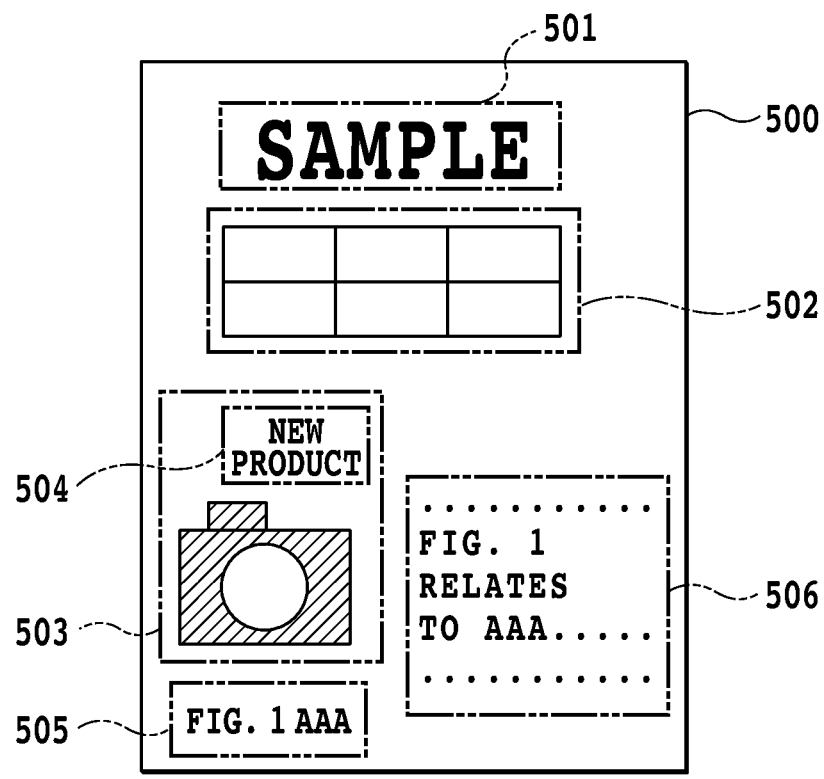
FIG. 5A shows an example of image data.

When the attribute information addition processing described above is performed, in the image data shown in FIG. 5A, the "heading" attribute is added to the region 501, the "table" attribute is added to the region 502, the "photograph" attribute is added to the region 503, the "character" attribute is added to the region 504, the "caption" attribute is added to the region 505 and the "text" attribute is added to the region 506. Since the "caption" attribute is added to the region 505, the region 503 is associated as a region accompanying the "caption" with the region 505. The region 503 to which the "photograph" attribute is added applies to the "object" in the present embodiment, and the region 506 to which the "text" attribute is added applies to the previously described "description text for the object" since the region 506 includes the "Figure 1" that is an anchor expression. The addition of the attribute by the attribute information addition portion 302 means that, for example, as in a data table shown in FIG. 5B, the determined attribute is associated with each of regions obtained by division by the region division portion 301 and is stored in the storage portion 211 and the like.

The character recognition portion 303 performs known character recognition processing on a region including a character image (that is, a region whose attribute is the "character", the "text", the "heading", the "small heading", the "caption" or the like), and associates the result as character information with a region of interest and stores it in the storage portion 211. For example, as shown in FIG. 5B, in the regions 501 and 504 to 506, the item of the "character information" is associated with the character information that is the result of the character recognition processing.

As described above, information on the position, the size and the region attribute, information on the page, the character information on the character recognition result (character code information) and the like extracted by the region division portion 301, the attribute information addition portion 302 and the character recognition portion 303 are associated for each of the regions and are stored in the storage portion 211. For example, when an input image data example shown in FIG. 5A is processed, an example of a data table that is stored in the storage portion 211 is shown in FIG. 5B. Although, in FIGS. 5A and 5B, detailed explanations are omitted, preferably, an attribute of a "character in a table" is given to the region of a character image in a region whose attribute is the "table", and the character recognition processing is performed on it, and the result of the processing is stored as character information. Since, as shown in FIG. 5B, the region 504 is a region on a character image included in a photograph or a figure, an attribute of "within a photograph of 503" is added.

The link processing portion 304 generates link information between a region (region whose attribute is the "photograph", the "line figure", the "table", the "illustration" or the like) accompanying the caption detected by the attribute information addition portion 302 and the "text including an anchor expression". Then, the link processing portion 304 stores the generated link information in the storage portion 211. The details of the link processing portion 304 will be explained later.

The format conversion portion 305 uses information obtained from the region division portion 301, the attribute information addition portion 302, the character recognition portion 303 and the link processing portion 304 to convert the input image data 300 into the electronic document data 310. Examples of the electronic document data 310 include file formats such as SVG, XPS, PDF and Office Open XML. The converted electronic document data 310 is either stored in the storage portion 211 or transmitted to the client PC 101 through the LAN 102. The user of the document reads the electronic document data 310 with an application (for example, Internet Explorer Adobe Reader or MS Office (registered trademarks)) installed in the client PC 101. The reading of the electronic document data 310 with the application will be described in detail later. The electronic document data 310 includes page display information (such as an image for display) by graphics or the like and content information (such as metadata) by semantic description of a character or the like.

The processing performed in the format conversion portion 305 is mainly two. One is to perform, on each region, flattening and smoothing, edge enhancement, color quantization, binarization and the like, to perform processing for conversion into a specified format and to allow storage in the electronic document data 310. Conversion into graphic data (vector data) of vector pass description or graphic data (JPEG data) of bitmap description is performed on, for example, the region whose attribute is the "character", the "line figure" or the "table". As a technology for conversion into vector data, a known vectorization technology can be used. Region information (position, size and attribute) stored in the storage portion 211, character information within the region and link information are made to correspond to them, and conversion into the electronic document data 310 is performed.

In the format conversion portion 305, the conversion processing method performed on each region differs depending on the region attribute. For example, the vector conversion processing is suitable for graphics, such as a character and a line figure, whose colors are composed of black and white or a few colors whereas the vector conversion processing is not suitable for an image region having gradation such as a photograph. In order for the appropriate conversion to be performed as described above and according to the attribute of each region, a corresponding table shown in FIG. 5C is set in advance and the conversion processing is performed based on the corresponding table.

For example, according to the corresponding table shown in FIG. 5C, the vector conversion processing is performed on the regions whose attributes are the "character", the "line figure" and the "table", and image clipping processing is performed on the region having the "photograph" attribute.

In the corresponding table shown in FIG. 5C, data representing whether or not processing for erasing the image information on the region from the image data 300 is present is stored associating with each attribute. For example, when the region of the "character" attribute is converted into the vector pass description data according to the corresponding table shown in FIG. 5C, the presence of the erasing processing is indicated. Hence, on the image data 300, processing for using surrounding colors to paint out a pixel corresponding to a portion covered by the converted vector pass is performed. Likewise, when the region of the "photograph" attribute is clipped as a rectangular image part, on the image data 300, processing for using surrounding colors and the like to paint out a region range corresponding to the clipped region is performed.

The purpose of performing the erasing processing described above is that the image data 300 after completion of the processing of each region (after completion of the painting-out processing) can be utilized as part data on the image of the "background". In this image data (background image) for background, parts (for example, a pixel corresponding to base within the image data 300) other than the region obtained by division by the region division processing are left. When the electronic document data 310 is described, the description is performed by superimposing graphic data (foreground image) obtained by the vector conversion processing or the image clipping processing on the background image part data (background image) and displaying it. In this way, it is possible to prevent lack of information on the background image (the color of the base) and form graphic data without redundancy.

Hence, although, on the region (character region) of the "character" attribute, the image clipping processing using binarization and the image erasing processing from the image data 300 are performed, it is possible not to perform the vectorization processing and the image clipping processing on the regions of the other attributes. In other words, the pixels on which the processing is not performed (pixel information within the region whose attribute is the "photograph", the "line figure" or the "table") are left within the background image part data, and they are described such that parts of the image of the "character" are superimposed on the background image.

A plurality of corresponding tables shown in FIG. 5C is prepared in advance, and selection may be made according to the applications of the electronic document data 310 that is output and the content of an electronic document. For example, the output based on the corresponding table shown in FIG. 5C is suitable for the reuse application of a graphics editor and the like because most objects are converted into vector pass description and thus image quality is excellent at the time of enlargement or reduction. In the other corresponding tables, character images are generated as individual binary images on an individual character color basis and are reversibly compressed, and thus it is possible to reproduce a character image portion with high quality, and the others are JPEG-compressed as the background image, and thus it is possible to increase the compression rate of a data size. This method is suitable for increasing the compression rate and producing data where character images are easily read. With the selectable uses as described above, it is possible to make the produced electronic document data appropriate.

An example of the generated electronic document data 310 is shown in FIG. 6. In the example shown in FIG. 6, an example obtained by performing, when the image data 500 shown in FIG. 5A is processed, description in a SVG (scalable vector graphics) format based on the data table (FIG. 5B) stored in the storage portion 211 is shown. Although a description here is given using the SVG format as an example, the format is not limited to the SVG format. PDF, XPS, Office Open XML, another PDL based data format or the like may be used instead.

Descriptions 601 to 606 of FIG. 6 are graphics descriptions on the regions 501 to 506, respectively, shown in FIG. 5A. Here, the descriptions 601, 604, 605 and 606 are examples of character drawing description corresponding to character codes; the description 602 is an example of vector pass description of a frame of a vector-converted table; and the description 603 is an example of description indicating that a photograph image on which the clipping processing has been performed is attached. In the examples of FIGS. 5B and 6, values are actually described in portions that are described with symbols such as coordinate values X1 and Y1. A description 607 is an example of description on link information. The description 607 is composed of descriptions 608 and 609. The description 608 is link information from a "region (hereinafter, an object) associated with a caption" to a "description text for the object". A description 610 is a link identifier and is associated with the object indicated by the description 603 and graphic data indicated by the description 611. Here, the graphic data refers to drawing information that is displayed, for example, when an anchor expression in a text region is clicked with a mouse while an electronic document generated in the input image of the present embodiment is being read with an application. A description 612 is information on the operation. In other words, the description 612 is information on the graphic data indicated by a description 611 when the reader of the document reads the electronic document data 310 with an application. Alternatively, the description 612 is information on the operation on the side of the application when an object indicated by the description 603 associated with the link identifier indicated by the description 610 is pressed down (or selected). The description 609 is link information from the "description text for the object" to the "object". Descriptions 613 to 615 are the same as the descriptions 610 to 612.

Figure 4:
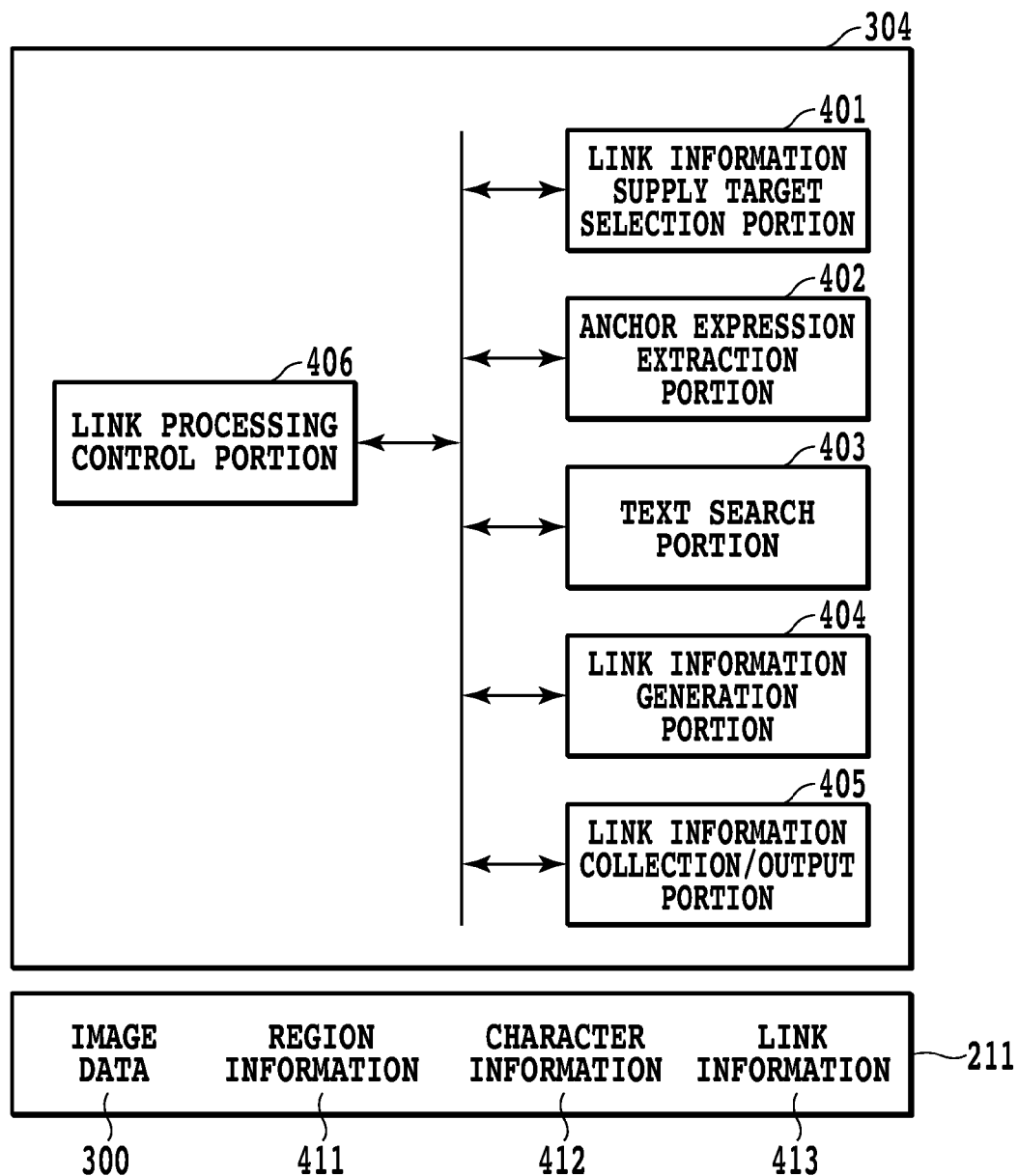
FIG. 4 is a block diagram showing an example of the configuration of a link processing portion 304.

FIG. 4 is a block diagram showing an example of the configuration of the link processing portion 304. The content of processing performed by the link processing portion 304 will be explained below. A link information supply target selection portion 401 selects a target object for link information generation on image data that has been input.

An anchor expression extraction portion 402 analyzes character information in a caption region accompanying the object selected by the link information supply target selection portion 401, and extracts an anchor expression from the analyzed character information. When the anchor expression is found, the anchor expression extraction portion 402 extracts as the anchor expression the corresponding portion from the character information and as the caption expression the other portions. The anchor expression extraction portion 402 also has the function of removing an insignificant character string (such as a meaningless symbol string) using the characteristic of a character code, a dictionary and the like. This is because the anchor expression extraction portion 402 copes with erroneous recognition and the like of the character recognition in which a decoration, a division line and an image appearing in the boundary of the text portion of a document are interpreted as characters. In order for the anchor expression to be extracted, a multilingual character string pattern such as figure numbers and the corresponding erroneous recognition pattern of character recognition are stored in the dictionary, and thus it is possible to enhance the extraction accuracy of the anchor expression and to perform the character correction of the anchor expression. The caption expression can be processed in the same manner as described above. In other words, an analysis using natural-language processing, erroneous recognition correction of character recognition and the like can be performed, and the function of correcting a symbol, a character decoration and the like appearing in the boundary with the anchor expression and in the front and back of the anchor expression and removing them can also be given.

A text search portion 403 uses the anchor expression extracted by the anchor expression extraction portion 402 to search for character information in each text region of the document, and detects the same anchor expression. The text search portion 403 specifies the corresponding region in a description expression in the text including the extracted anchor expression and describing the object, that is, the "description text for the object." Here, it is possible to produce search indices (as a technology for producing indices and a technology for utilizing it to achieve the high-speed search, known index producing/searching technologies can be used) for achieving the high-speed search. Moreover, with a batch search using a large number of anchor expressions, it is also possible to achieve the high-speed search. By storing and utilizing a multilingual character string pattern such as figure numbers and the corresponding erroneous recognition pattern of character recognition on the "description text for the object", it is possible to provide the function of enhancing the search accuracy and performing correction.

A link information generation portion 404 generates link information that associates the object selected by the link information supply target selection portion 401 with the "description text for the object" searched and extracted by the text search portion 403. Specifically, the link information generation portion 404 generates the link information indicating the specified "description text for the object" from the selected "object." At the same time, the link information generation portion 404 generates the link information of the opposite way, that is, the link information indicating the "object" from the "description text for the object" (mainly the anchor expression in the text). The generated link information is stored as link information 413 in the storage portion 211. In the present embodiment, link information associated with one way is referred to as one-way link information, and link information associated with two ways is referred to as two-way link information.

A link information collection/output portion 405 uses the link information 413 generated by the link information generation portion 404, converts it into a format that can be processed by the format conversion portion 305 and outputs it. Thus, the format conversion portion 305 generates the electronic document data 310.

A link processing control portion 406 entirely controls the link processing portion 304. Mainly, the link processing control portion 406 allocates each region of the image data 300 to appropriate processing portions 401 to 405, along with region information 411 (information on the position, the size and the attribute associated with each region) stored in the storage portion 211 of FIG. 2 and character information 412 within the region. The link processing control portion 406 also performs control of feeding information output from the processing portions 401 to 405 to the appropriate processing portions. As shown in FIG. 5B, the region information 411 and the character information 412 are stored in the storage portion 211 in the format of a data table associated with individual regions obtained by division by the region division portion 301 on the image data 300.

The operation of each portion of the link processing portion 304 will be explained again in more detail with an example where processing is actually performed.

Figure 7:
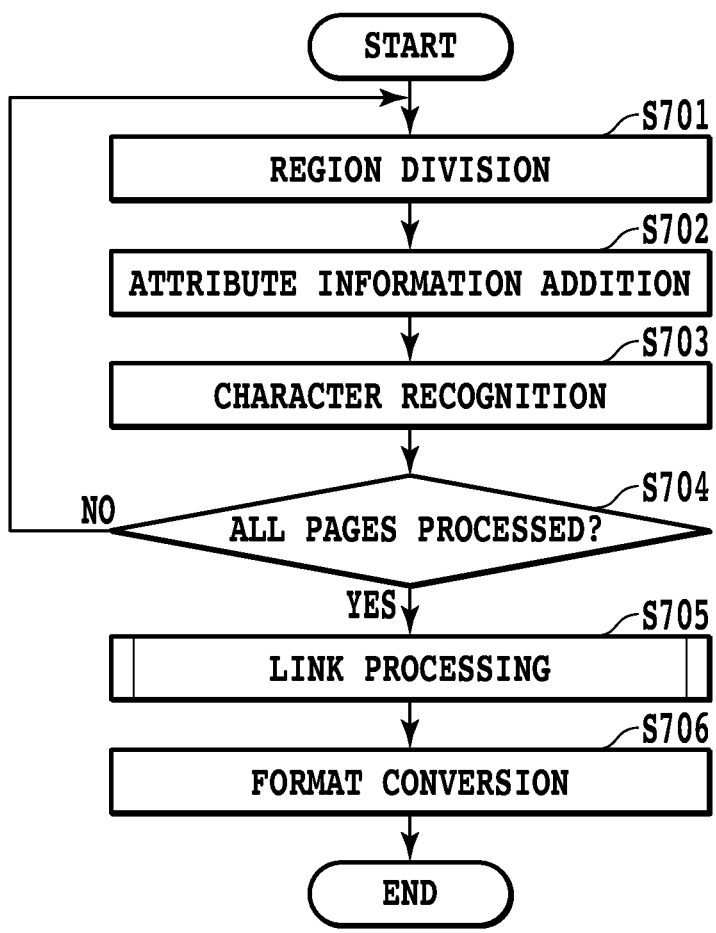
FIG. 7 shows a flowchart of the entire processing in a first embodiment.

The outline of the entire processing performed by the image processing system of the first embodiment will now be explained with reference to the flowchart of FIG. 7. The flowchart shown in FIG. 7 is assumed to be performed by the data processing portion 218 (the processing portions 301 to 305 of FIG. 3) of FIG. 2. In the present embodiment, the CPU 205 reads and executes computer programs stored in the storage portion 211 (computer-readable storage medium), and thereby functions as the data processing portion 218 (the processing portions 301 to 305 of FIG. 3). However, it should be noted that the present invention is not limited to this. For example, the data processing portion 218 (the processing portions 301 to 305 of FIG. 3) may be realized by hardware such as an electronic circuit.

FIG. 7 is the flowchart showing the procedure of processing image data composed of a plurality of pages input by the MFP 100 of FIG. 1 and converting it into electronic document data composed of a plurality of pages. In the first embodiment, the image data of a plurality of pages will be described with reference to image data shown in FIG. 9A. Each step of the flowchart of FIG. 7 will be described below.

Figure 9A:
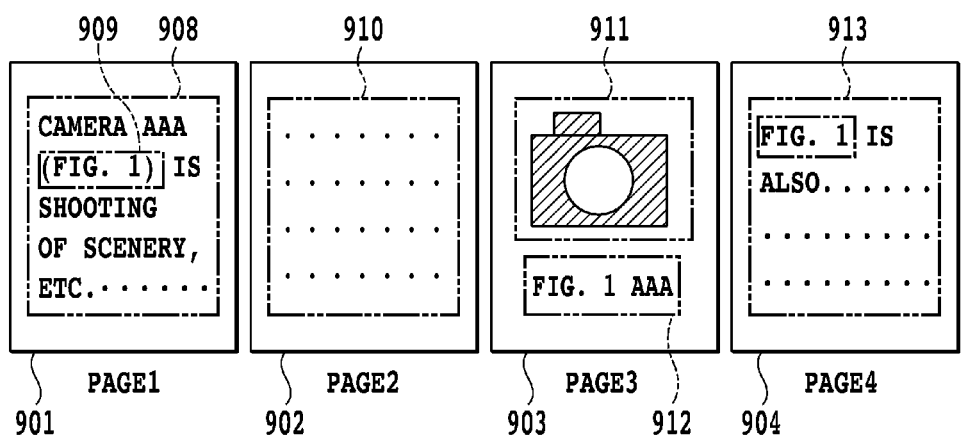
FIG. 9A shows an example of image data in the first embodiment.

At step S701, the region division portion 301 divides one page of input image data into regions to extract the regions. For example, a region 908 is extracted from image data 901 (page 1) shown in FIG. 9A. Furthermore, at step S701, as shown in FIG. 9B, the region division portion 301 determines a "coordinate X", a "coordinate Y", a "width W", a "height H" and a "page" in regard to the region 908 and stores it in the storage portion 211.

At step S702, the attribute information addition portion 302 adds an attribute to each region according to the type of region divided at step S701. For example on page 1 shown in FIG. 9A, the "text" attribute is added to the region 908. In an example on page 3 shown in FIG. 9A, the "photograph" attribute is added to a region 911, and the "caption" attribute is added to a region 912. Information indicating that the region 911 accompanies the region 912 is also added to the region 912. In other words, the region 911 is the "object" described above. The photograph region 911 to which the "photograph" attribute is added is the "object" in the present embodiment, and the text region 908 to which the "text" attribute is added is the "description text for the object" since an anchor expression to be described later is included. The attribute information addition portion 302 associates the "attribute" and the "region accompanying the caption" with the corresponding individual regions, and stores them in the storage portion 211.

At step S703, the character recognition portion 303 performs the character recognition processing on the region to which the attribute of the character (such as a text, a caption, a heading or a small heading) is added at step S702, associates the result with the region like character information, and stores it in the storage portion 211. For example, at step S703, the "character information" shown in FIG. 9B is stored as the result of the character recognition processing in the storage portion 211.

At step S704, the data processing portion 218 determines whether or not the processing at steps S701 to S703 is performed on all pages. If the processing is performed on all pages (yes at step S704), the process proceeds to step S705. If an unprocessed page is present (no at step S704), the process returns to step S701. As described above, the processing at steps S701 to S704 is performed on four pages of the image data 901 to 904 shown in FIG. 9A.

Then, at step S705, the link processing portion 304 performs the link processing for the extraction of the anchor expression, the generation of graphic data and the generation of the link information. The details of the link processing performed by the link processing portion 304 at step S705 will be described later with reference to the flowchart of FIG. 8. After completion of the link processing, the process proceeds to step S706.

At step S706, the format conversion portion 305 converts, based on the information stored in the storage portion 211 as shown in FIGS. 9B and 9C, the image data 300 into the electronic document data 310. As described in FIG. 4, the format conversion portion 305 performs conversion processing on regions within the image data 300 according to the corresponding table indicating the conversion processing method needed to be performed on each region. Here, it is assumed that the conversion is performed using the corresponding table shown in FIG. 5C.

Here, the explanation of FIG. 7 has been completed.

The details of the link processing at step S705 in FIG. 7 will now be described with reference to the flowchart of FIG. 8.

At step S801, the link information supply target selection portion 401 references the region information 411 stored in the storage portion 211, and selects one of regions on which the link information generation processing has not been performed from the regions (regions such as a figure, a photograph and an illustration) indicating the "object." In other words, if there is an object that has not been processed, the non-processed object is selected as an object to be processed, and the process proceeds to step S802. If there is no object or all objects have been processed, the process proceeds to step S812. For example, the photograph region 911 is first selected from the image data 901 to 904 of four pages shown in FIG. 9A.

At step S802, with respect to the object selected by the link information supply target selection portion 401, the anchor expression extraction portion 402 extracts an anchor expression and a caption expression from character information in a caption region accompanying the object. Here, the anchor expression refers to character information (character string) for identifying an object, and the caption expression refers to character information (character string) for describing an object. In the character information included in the caption region accompanying the object, the following cases are possible: a case where an anchor expression alone is described therein; a case where a caption expression alone is described therein; a case where both expressions are described therein; and a case where neither of those expressions is described therein. For example, the anchor expression is often expressed as a combination of a specific character string such as a "figure" or "Fig" with a number or a symbol. Hence, an anchor character string dictionary in which those specific character strings are registered is prepared in advance, and it is possible to identify an anchor expression (that is, an anchor character string+a number/symbol) by comparing the caption expression with the dictionary. Among character strings in the caption region, character strings other than the anchor expression are determined to be the caption expression. In other words, with respect to character information "Figure 1 AAA" in the caption region 912, the anchor expression is "Figure 1", and the caption expression is "AAA." Specifically, as shown in FIG. 9B, since the caption region 912 is associated as a caption accompanying the photograph region 911, the anchor expression extraction portion 402 extracts the anchor expression "Figure 1" from the character information in the caption region 912. Then, as shown in FIG. 9B, the anchor expression extraction portion 402 associates the caption region 912 with the anchor expression "Figure 1", and stores it in the storage portion 211. If there is no caption region in the selected object or no anchor expression is included in the character information corresponding to the caption region at step S802, the anchor expression is not extracted.

At step S803, the link processing control portion 406 determines whether or not an anchor expression is extracted from the caption region at step S802. If the anchor expression is extracted (yes at step S803), the process proceeds to step S804 whereas, if the anchor expression is not extracted (no at step S803), the process returns to step S801. Since, in the image data shown in FIG. 9A, the anchor expression is extracted from the caption region 912 related to the object 911, the process proceeds to step S804.

At step S804, the text search portion 403 searches the character information in the text region stored in the storage portion 211 for an anchor expression identical to the anchor expression extracted by the anchor expression extraction portion 402. For example, the text search portion 403 searches the character information in the text regions 908, 910 and 913 shown in FIG. 9B for the same anchor expression extracted from the caption region 912. Here, since the "Figure 1" is included in the character information corresponding to the text region 908, the text search portion 403 extracts the anchor expression from the character information in the text region 908.

At step S805, the text search portion 403 determines whether or not an anchor expression is detected from the character information in the text region at step S804. If the anchor expression is detected (yes at step S805), the process proceeds to step S806 whereas, if the anchor expression is not detected (no at step S805), the process returns to step S801. If, at step S805, an anchor expression is detected from the text region, this text region is associated with the anchor expression, and it is stored in the storage portion. For example, as shown in FIG. 9B, the text region 908 is associated with the anchor expression "Figure 1", and it is stored in the storage portion 211.

Hereinafter, in steps S806 and S807, the processing of the object selected at step S801 is performed. Also, insteps S808 and S809, the processing of the text region from which the anchor expression is detected at step S804 is performed.

At step S806, the link information generation portion 404 generates a link identifier on an object, associates it with the object selected by the link information supply target selection portion 401 and stores it in the storage portion 211. For example, as shown in FIG. 9B, the link information generation portion 404 generates a link identifier "image_01", and associates the link identifier with the photograph region 911 of the object. If there are M regions corresponding to the object, the link information generation portion 404 generates, as the link identifiers "image_01" to "image_M", M link identifiers, and associates them with the corresponding regions.

At step S807, the link information generation portion 404 generates graphic data on an object, associates the graphic data with the link identifier generated at step S806, and stores it in the storage portion 211. Here, the graphic data generated at step S807 indicates an image peripheral region including at least a figure, a table or the like within the object. For example, as shown in FIG. 9C, the graphic data is data that is composed of a "coordinate X", a "coordinate Y", a "width W" and a "height H." In the example of FIG. 9C, the graphic data (the "coordinate X", the "coordinate Y", the "width W" and the "height H")=("X15", "Y15", "W15" and "H15") associated with the link identifier "image_01" indicates an image peripheral region 1102 shown in FIG. 11A. In other words, at the position of the coordinate X (X15) and the coordinate Y (Y15), the region is a region in which the width W is "W15" and the height H is "H15." A color associated with the link identifier "image_01" shown in 915 of FIG. 9C indicates the color of a line segment when the image peripheral region 1102 is represented as a rectangular line segment by an application described later. This color can be set at any color. Although, in the present embodiment, the graphics based on the graphic data is described as a rectangle, the graphics is not limited to a rectangle, and any shape may be used.

At step S808, the link information generation portion 404 generates a link identifier on a text region, associates it with the text region having the "anchor expression" detected by the text search portion 403 and stores it in the storage portion 211. For example, as shown in FIG. 9B, the link information generation portion 404 generates a link identifier "text_01", and associates the link identifier with the text region 908. If there are N text regions having the same anchor expression, the link information generation portion 404 generates, as the link identifiers "text_01" to "text_N", N link identifiers, and associates them with the corresponding regions.

Figure 11A:
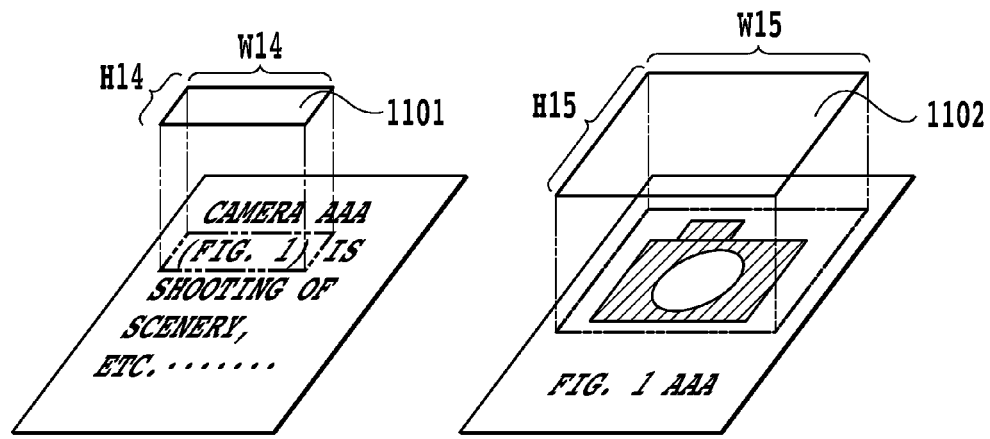
FIGS. 11A and 11B are diagrams illustrating graphic data in the first embodiment.
Figure 11B:
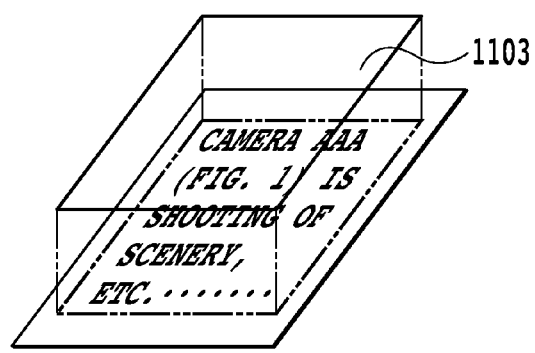

Then, at step S809, the link information generation portion 404 generates graphic data, associates the graphic data with the link identifier generated at step S808 and stores it in the storage portion 211. Here, the graphic data generated at step S809 indicates an anchor expression peripheral region including at least the anchor expression extracted at step 804. For example, graphic data (the "coordinate X", the "coordinate Y", the "width W" and the "height H")=("X14", "Y14", "W14" and "H14") associated with the link identifier "text_01" shown in FIG. 9C indicates an anchor expression peripheral region 1101. In other words, at the position of the coordinate X (X14) and the coordinate Y (Y14), the region is a region in which the width W is "W14" and the height H is "H14"; as shown in FIG. 11A, this region includes at least the anchor expression "Figure 1." As with an anchor expression peripheral region 1103 shown in FIG. 11B, the range of this region is not only the periphery of the anchor expression "Figure 1", and the range may be the entire text region including the anchor expression. Although, in the present embodiment, the anchor expression peripheral region indicated by the graphic data and the image peripheral region are described as rectangles, they are not limited to rectangles, and any shape, line or the like may be used as long as they are drawing information that is displayed and highlighted so as to be easily understood by the reader of the application.

At step S810, the link information generation portion 404 generates a link to the "description text for the object" from the "object." The generated link information includes information indicating a response operation when the reader of the electronic document in the present embodiment takes any action to the object. The response operation refers to an operation of moving, for example, when a reader clicks an object within an electronic document being read with a mouse or the like, to a page on which a description expression for the object is present and of displaying and highlighting a graphic data portion corresponding to a link destination with a specified color. Here, the production of the link at step S810 is related to an "action of the reader" and an "action of the application" in the link information 915 shown in FIG. 9C. The "action of the reader" shown in FIG. 9C is associated with information on an operation performed by the reader on the object. Here, in terms of clinking of the object with a mouse or the like, the "action of the reader" in the link information 915 is associated with a "click." When it is detected that the operation specified by the "action of the reader" is performed, information indicating how the application performs a response operation is stored in the "action of the application." For example, in terms of the movement to the link destination as the operation of the application, the "action of the application" in the link information 915 shown in FIG. 9C is associated with the "movement to the link destination (text_01)." Here, the "(text_01)" is the link identifier generated at step S808. At step S810, information on the "action of the reader", the "action of the application" and the "color" is associated with the link identifier, and it is stored as the link information 915 in the storage portion 211. Although the above description discusses an example where the information on color is independently specified on each link identifier, default specification may be performed so as to specify the same color at a time.

The link information 915 shown in FIG. 9C will now be described below using a specific example. For example, when the reader clicks the photograph region 911 ("object") associated with the link identifier (image_01), the reader moves to a page including the text region 908 ("description text for the object") associated with the link identifier (text_01). Then, a rectangle based on the graphic data (the "coordinate X", the "coordinate Y", the "width W" and the "height H")= ("X14", "Y14", "W14" and "H14") associated with the link identifier "text_01" is displayed in red (specified color).

At step S811, the link information generation portion 404 generates a link to the object in regard to the "description text for the object." The generated link includes information indicating a response operation when the reader of the electronic document in the present embodiment takes any action to the "description text for the object" (mainly a region of graphic data indicating the vicinity of the anchor expression in the text). Here, the production of the link at step S811 is related to the "action of the reader" and the "action of the application" in the link information 914 shown in FIG. 9C. For example, in terms of clinking of a portion corresponding to the anchor expression in the text within the electronic document read by the reader with a mouse or the like, the "action of the reader" in the link information 914 is associated with a "click." In terms of the movement to the link destination as the operation of the application, the "action of the application" in the link information 914 is associated with the "movement to the link destination (image_01)." Here, the "(image_01)" is the link identifier generated at step S806. At step S811, information on the "action of the reader", the "action of the application" and the "color" is associated with the link identifier, and it is stored as the link information 914 in the storage portion 211.

The link information 914 shown in FIG. 9C will now be explained below using a specific example. The reader first clicks a partial region (text region 908 (that is, the "description text for the object")) corresponding to graphic data associated with the link identifier (text_01). When it is clicked, the reader moves to a page including the photograph region 911 ("object") associated with the link identifier (image_01). Then, a rectangle based on the graphic data (the "coordinate X", the "coordinate Y", the "width W" and the "height H")= ("X15", "Y15", "W15" and "H15") associated with the link identifier "image_01" is displayed in red (specified color).

As described above, at steps S810 and S811, the link information from the "object" to the "description text for the object" and the link information in the opposite way, from the "description text for the object" (mainly the anchor expression in the text) to the "object" are generated. The link information generated in the present embodiment is link information of two ways, that is, two-way link information.

Thereafter, the processing at steps S802 to S811 is performed on all the objects, and, if at step S801, no unprocessed object is determined to be present, the process proceeds to step S812.

At step S812, the information stored in the storage portion 211 shown in FIGS. 9B and 9C at steps S802 to S811 is collected. And then, the information is output in a format that can be received at step S706 by the format conversion portion 305 and the process is completed. If, at step S801, no object is determined to be present (no at step S801), no processing is performed. Then, the process completes.

As described above, the explanation of FIG. 8 has completed.

An operation performed when the reader of the document reads the electronic document data generated in the present embodiment with an application will now be described with reference to FIGS. 10A to 10C.

Figure 10A:
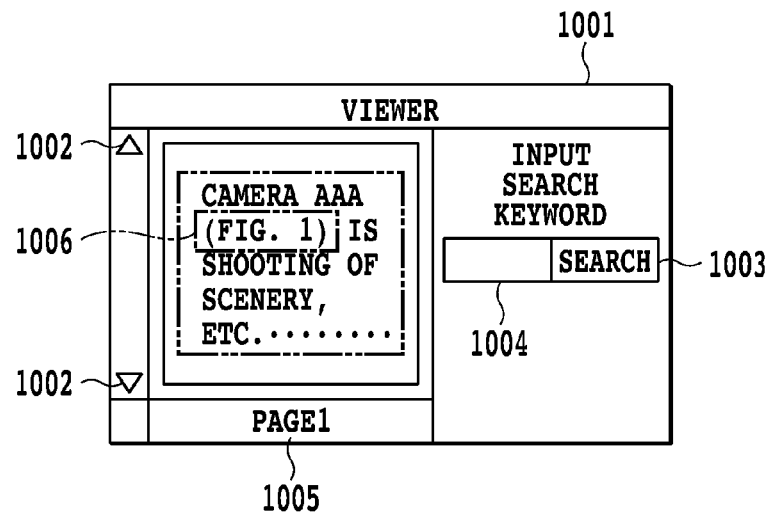
FIGS. 10A-10C are diagrams illustrating a display example by an application in the first embodiment.
Figure 10B:
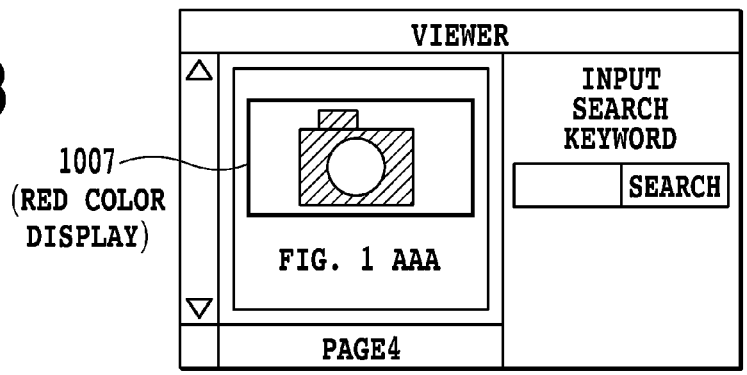
Figure 10C:
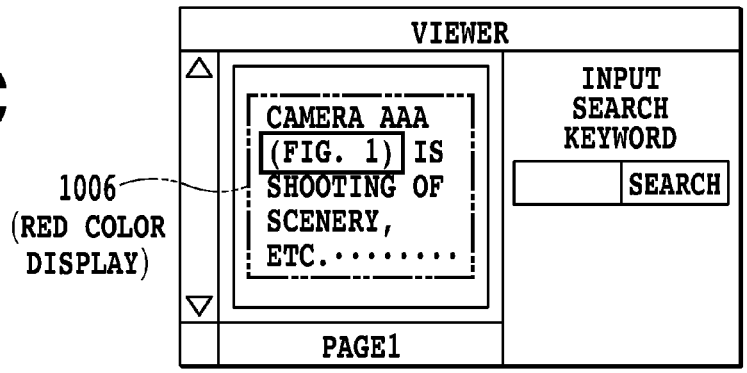

FIGS. 10A to 10C are an example of a display screen of virtual GUI software that is executed by the client PC 101 of FIG. 1, other client PCs and the like as an application for reading electronic document data including link information. An actual example of such an application includes Adobe Reader (registered trademark). Furthermore, it may be an application that can be displayed and operated by the operation portion 203 of the MFP 100. When the application is Adobe Reader (registered trademark), the format of the electronic document data described above and shown in FIG. 6 needs to be PDF.

Figure 8:
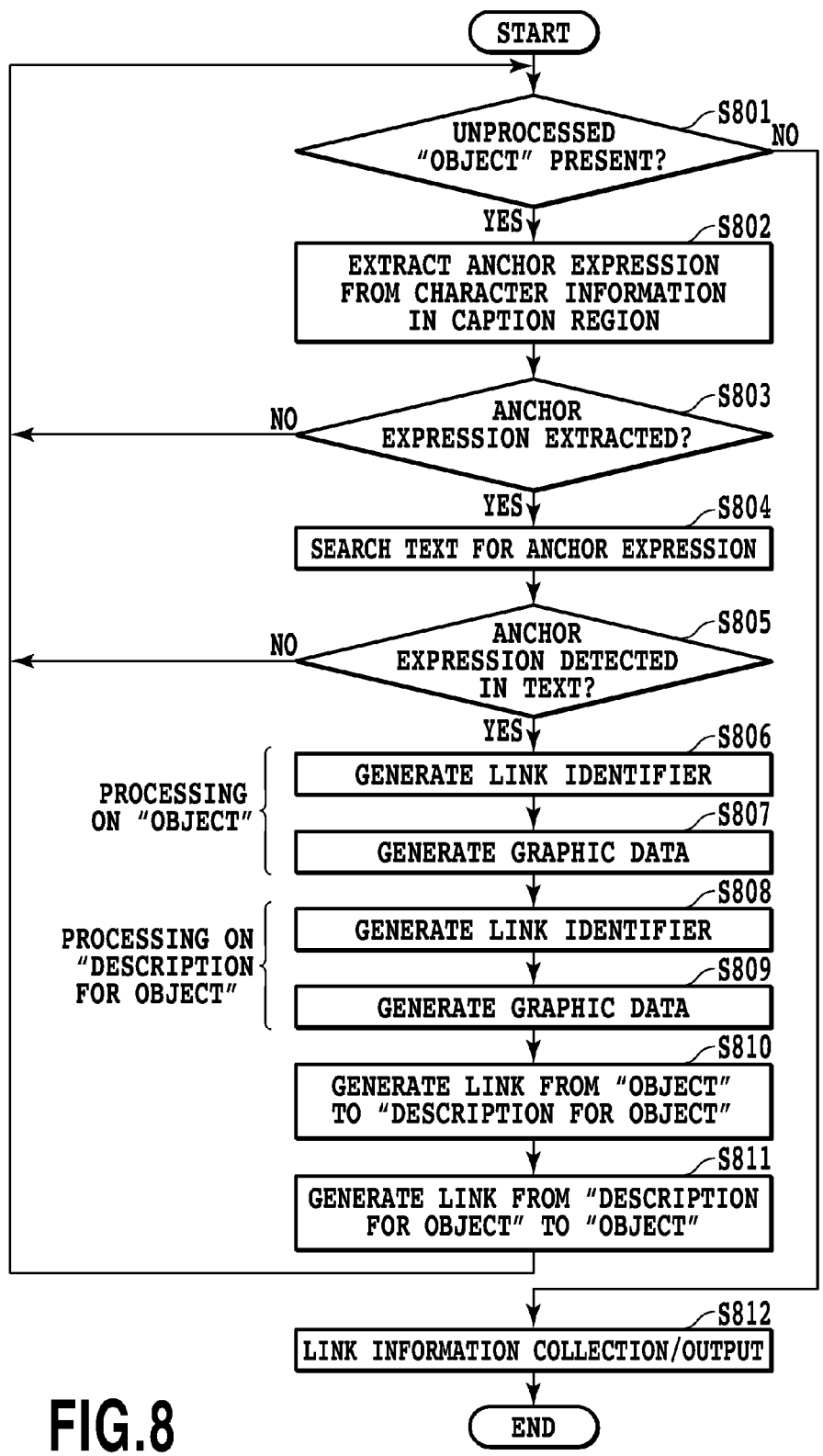
FIG. 8 shows a flowchart of link processing in the first embodiment.

FIG. 10A shows an example of an application 1001 for reading the electronic data generated by the processing of FIGS. 7 and 8. FIG. 10A shows how page 1 in the image data shown in FIG. 9A (link information in the present embodiment has already been generated) is displayed on the application 1001 as an example of the electronic document. A page scroll button 1002 is a button that the reader presses down on the screen with a mouse or the like for displaying the previous page or the subsequent page. A window 1004 is an entry field into which a search key word is entered; a search execution button 1003 is a button that is used to start a search after a key word to be searched is entered. A status bar 1005 shows a page number for the page that is currently displayed.

In a conventional technology, when the reader reads the electronic document data and searches for an object indicated by the anchor expression (e.g. "Figure 1") included in an anchor expression peripheral region 1006, a method of searching for it by pressing down the page scroll button 1002 is generally used. An another method of searching for it by entering the "Figure 1" as a search key word is also generally used. Then, the reader reads the object indicated by the anchor expression, thereafter presses down the page scroll button 1002 to return to page 1 and reads the subsequent sentences.

On the other hand, in the present invention, when the reader reads the electronic document data including the link information described above, the reader clicks the anchor expression peripheral region 1006 including the anchor expression shown in FIG. 10A. When the clicking is performed, a page including an image peripheral region 1007 is displayed, as shown in FIG. 10B, on the screen of the application according to the link information 914 shown in FIG. 9C. In other words, page 4 including the object indicated by the anchor expression "Figure 1" is displayed, and thus the reader can easily find the object indicated by the anchor expression. The line segment of the outer circumference of the image peripheral region 1007 is displayed in red according to the link information 914. Then, when the reader clicks with a mouse the image peripheral region 1007 on the screen of the application 1001, a page including the anchor expression peripheral region 1006 is displayed as shown in FIG. 10C according to the link information 915. At this point, the line segment of the outer circumference of the anchor expression peripheral region 1006 is displayed in red according to the link information 915.

Figure 9D:
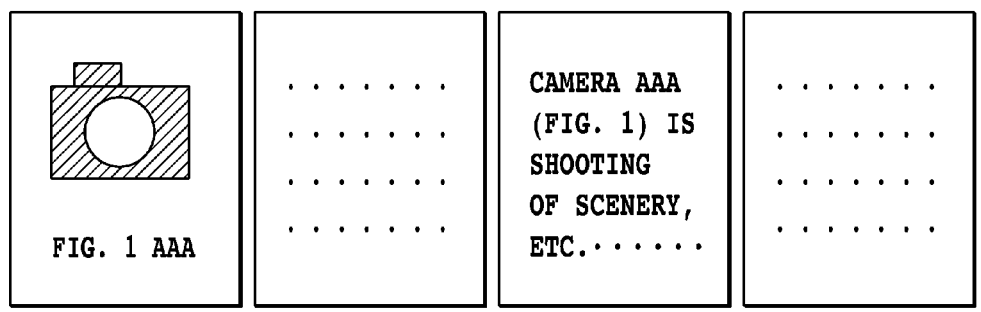
FIG. 9D shows an example of an electronic document in the first embodiment.

When the image data shown in FIG. 9D (link information in the present embodiment has already been generated) is read as an example of the electronic document, the operation of the application is the same as the example of the operation. In this case, since a figure is displayed on page 1 in the application, the reader starts an operation of clicking the object with a mouse in order to search for a description expression for describing the figure. The description of the subsequent operations of the application is omitted.

As described above, in the present embodiment, the electronic document data including the two-way link information between the "object" and the "description text for the object" is automatically generated in a paper document including the "object" and the "description text for the object", and thus the following effects are obtained. When the reader reads the "text including the anchor expression", that is, the "description text for the object", and searches for the corresponding "object", it is possible to display the "object" with a simple operation. Moreover, by utilizing the drawing information (graphic data) highlighting the "object", it is possible to make the position of the "object" legible. It is also possible to return to the "description text for the object" with a simple operation. Furthermore, at the time of the return to the "description text for the object", it is possible to make the immediately previously read position (what page, what paragraph and what line) legible. Likewise, even when the "object" is first read, it is possible to display the "description text for the object" with a simple operation.

In the present embodiment, an explanation is mainly given of a case where, in a document having a plurality of pages, a page having the "object" and a page having the "description text for the object" are separated from each other. However, the present invention is not limited to this; the same effects are obtained even in a paper document in which it is difficult to understand a correspondence between the "object" and the "description text for the object." One example is a paper document in which a page having the "object" and a page having the "description text for the object" are the same but they are located apart from each other. Another example is a paper document in which at least one of the "object" and the "description text for the object" is described as a small description (including small characters). Yet another example is a document having a complicated layout.

Second Embodiment

The first embodiment deals with a case where, as shown in FIG. 9A, one anchor expression for one "object" is present in the text. In the second embodiment, a case where a plurality of anchor expressions corresponding to the "object" is preset in the text will be described with reference to FIGS. 12A to 15G. The description of the same parts as in FIGS. 9A to 9C will not be repeated.

Figure 12A:
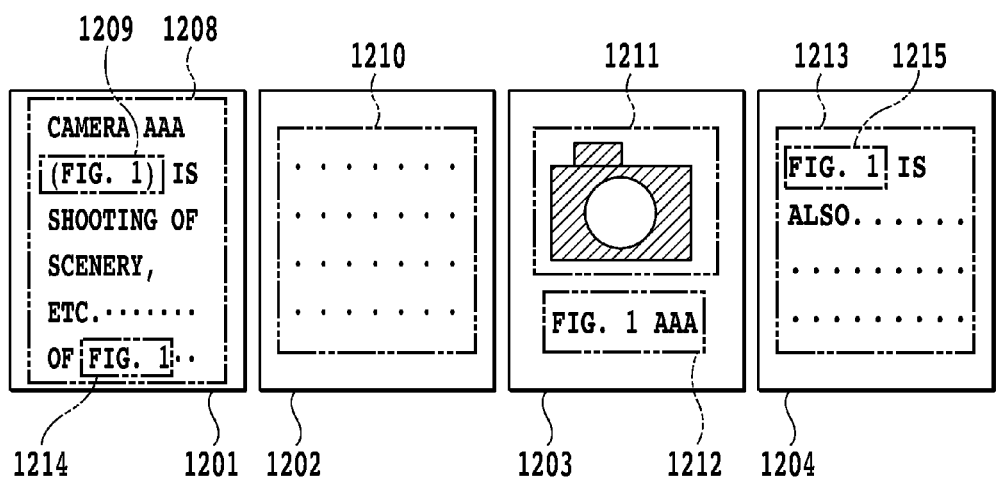
FIG. 12A shows an example of image data in a second embodiment.

FIG. 12A shows image data composed of four pages indicated by reference numerals 1201 to 1204; a region 1211 indicates the "object" and regions 1208 and 1213 indicate the "description text for the object." Regions 1209, 1214 and 1215 are anchor expression peripheral regions included in the "description text for the object." The same processing as in the flowcharts shown in FIGS. 7 and 8 in the first embodiment is performed on the image data shown in FIG. 12A, and thus electronic document data including two-way link information is generated. However, at step S810 shown in FIG. 8, the processing corresponding to the flowchart shown in FIG. 13 is performed, and thus a link from the object to the "description text for the object" is generated.

Figure 13:
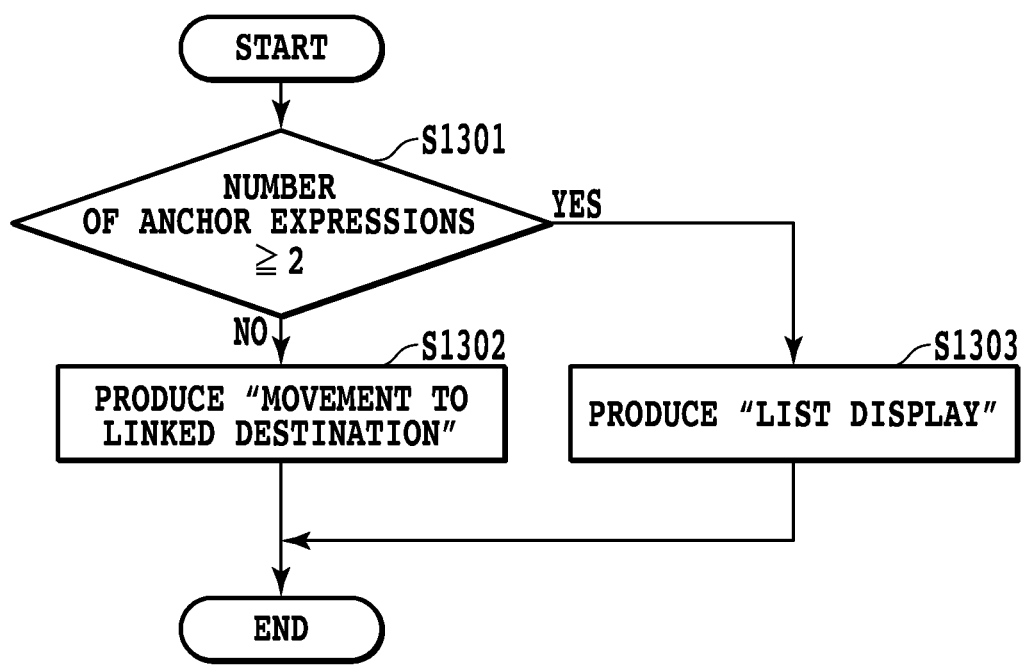
FIG. 13 shows a flowchart of link processing in the second embodiment.

FIG. 13 is a flowchart showing processing for generating information on an "action of an application" in the generation of the link previously described at step S810 shown in FIG. 8. Processing for generating information on an "action of the reader" is the same as in the first embodiment, and thus its description will not be repeated.

At step S1301, the link information generation portion 404 determines whether or not the number of anchor expressions extracted from the text at step S804 is two or more. If it is one (no at step S1301), the process proceeds to step S1302 whereas if it is two or more (yes at step S1301), the process proceeds to step S1303.

At step S1302, the link information generation portion 404 generates information indicating an instruction to move to a link destination on the "action of the application." Then, the link information generation portion 404 associates the generated information with a link identifier, and stores it in the storage portion 211.

At step S1303, the link information generation portion 404 generates, as information for the "action of the application", information indicating an instruction to display a list, associates it with candidate display information and stores it in the storage portion 211. The display of the list is information for giving an instruction to display the list of choices of destinations so that, since the number of anchor expressions for one "object" in the text is two or more, the reader can select which of the positions of the anchor expressions the reader moves to. This information on the display of the list includes information on a link identifier associated with the extracted anchor expression. In the second embodiment, the information for giving an instruction to move to the link destination is referred to as link information, the information for giving an instruction to display the list is referred to as the candidate display information and they are distinguished from each other. In other words, it is important that, if the number of anchor expressions for one "object" is one, the link information is generated whereas if a plurality of anchor expressions is present, the candidate display information is generated.

The result of processing according to the second embodiment and performed by the image processing device will now be described. By performing the processing according to the second embodiment, two anchor expressions "Figure 1" are extracted from the text region 1208 on page 1 shown in FIG. 12A. Hence, as shown in FIG. 12B, the text region 1208 is associated with two link identifiers "text_01" and "text_02." When, as described above, a plurality of anchor expressions is obtained by searching a text region, one text region is associated with a plurality of link identifiers. Since an anchor expression "Figure 1" is further extracted from the text region 1213 on page 4 shown in FIG. 12A, the text region 1213 is associated with one link identifier "text_03." Then, as in the first embodiment, the processing at steps S808, S809 and S811 is performed and thus link identifiers "text_01" to "text_03" are associated with link information 1216 to 1218 shown in FIG. 12C. In other words, the "graphic data", the "action of the reader", the "action of the application" and the "color" are associated. Here, it is assumed that the "action of the application" includes an instruction for the "movement to the link destination (image_01)", and the application also includes an instruction for the "temporary storage of information on the peripheral region of the clicked anchor expression."

On the other hand, an object 1211 is associated with the link identifier "(image_01)" by the processing at step S806, and is further associated with graphic data corresponding to the link identifier "(image_01)" by the processing at step S807. Then, since a plurality of anchor expressions is extracted from the text, at step S1303 in the flowchart of FIG. 13, the "display of the list" is associated as the "action of the application", and the "color" becomes "-" (meaning that it is not used). The "display of the list" with which the candidate display information 1219 is associated includes information on the link identifiers "(text_01)" to "(text_03)."

An operation performed when the reader of the document reads the electronic document data of the second embodiment with the application will now be described with reference to FIGS. 12A-C, 14A, 14B and 15A-G.

FIGS. 14A and 14B are flowcharts showing a procedure performed by the application according to the description of the electronic document data generated in the second embodiment. FIG. 14A shows processing performed when the anchor expression peripheral region in the text is clicked; FIG. 14B shows processing performed when the image peripheral region is clicked.

The flowchart shown in FIG. 14A will first be described.

Figure 15A:
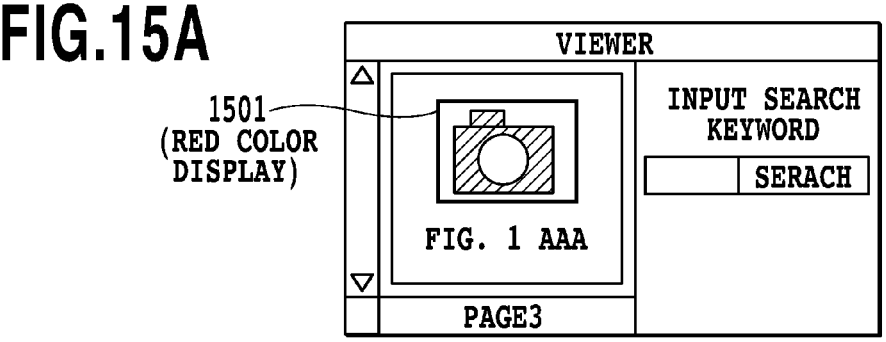
FIGS. 15A-15G show diagrams illustrating a display example by an application in the second embodiment.

At step S1401, when the reader clicks the anchor expression peripheral region on the application, the application displays, according to the link information, a page including a region associated with an identifier indicated by the "movement to the link destination." Specifically, the operation is performed according to the information on the "action of the application" in the link information 1216 to 1218 shown in FIG. 12C, that is, an instruction for the "movement to the link destination." Then, according to the information on the "color" in the link information 1216 to 1218 shown in FIG. 12C, the line segment of the outer circumference of the image peripheral region is highlighted along with red graphics. More specifically, a result obtained by clicking the anchor expression peripheral regions 1209, 1214 and 1215 is shown in FIG. 15A. FIG. 15A shows how the reader moves to page 3, and the line segment of the outer circumference of the image peripheral region 1501 is displayed in red whatever anchor expression peripheral region is clicked.

At step S1402, the application temporarily holds position information on the anchor expression peripheral region selected by the reader at step S1401. In other words, the image peripheral region displayed at step S1401 holds the position information such that which of the anchor expression peripheral regions 1216 to 1218 is selected and displayed by the reader can be identified. Specifically, the position information is information (position information indicating the position of the anchor expression peripheral region, identification information for identifying the anchor expression peripheral region or the link identifier corresponding to the anchor expression peripheral region) on the clicked anchor expression peripheral region. The temporarily held position information is used in processing performed when the image peripheral region shown in FIG. 14B is clicked.

The flowchart shown in FIG. 14B will now be explained.

At step S1403, when the reader clicks the image peripheral region, the application makes a reference to check whether or not the position information is maintained. If the position information is maintained, this indicates that the image peripheral region is displayed by the immediately previous selection of any of the anchor expression peripheral regions by the reader.

At step S1404, the application determines, based on the position information referenced at step S1403, whether or not the image peripheral region is displayed according to the link information. If the position information is present, the image peripheral region is determined to be displayed according to the link information from the anchor expression peripheral region, and the process proceeds to step S1408. If the position information is not present, the process proceeds to step S1405.

Figure 15B:
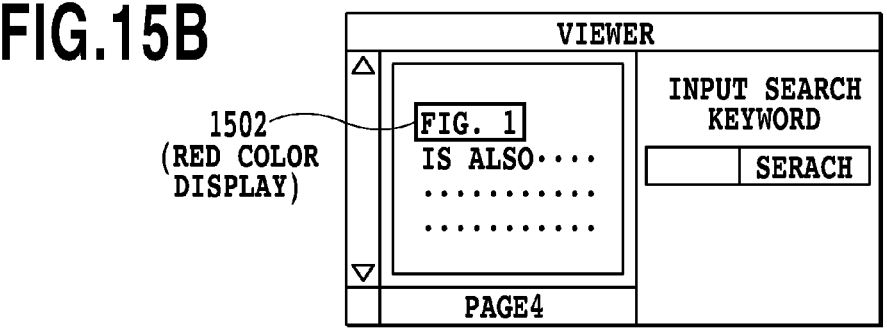

At step S1408, the application references, based on the position information, the position of the anchor expression peripheral region selected by the reader before the image peripheral region is displayed, and displays the anchor expression peripheral region corresponding to the position. A description will be given of a case where the image peripheral region 1501 shown in FIG. 13A is displayed by clicking, for example, the anchor expression peripheral region 1215 shown in FIG. 12A. When this image peripheral region 1501 is clicked, as shown in FIG. 15B, the image including the anchor expression peripheral region 1502 clicked before the display movement is displayed.

Then, at step S1405, the application determines whether or not the information on the "action of the application" associated with the link identifier corresponding to the image peripheral region clicked by the reader is the "movement to the link destination" or the "display of the list." As described above, as the description of the electronic document data, the "action of the application" includes the description in which, if the number of anchor expressions is one, the "movement to the link destination" is performed whereas if the number of anchor expressions is two or more, the "display of the list" is described. If the "movement to the link destination" is performed (step S1405; the movement to the link destination), the process proceeds to step S1406 whereas if the "display of the list" is performed (step S1405; the display of the list), the process proceeds to step S1407.

At step S1406, the application displays the text region including the anchor expression peripheral region associated with the link identifier indicated by the "movement to the link destination", and highlights it in red so that the anchor expression peripheral region can be identified. Since the movement to the link destination is the same as in the first embodiment, its description will not be repeated.

Figure 15C:
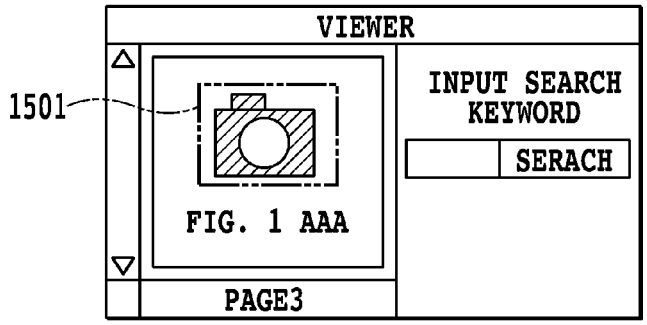
Figure 15D:
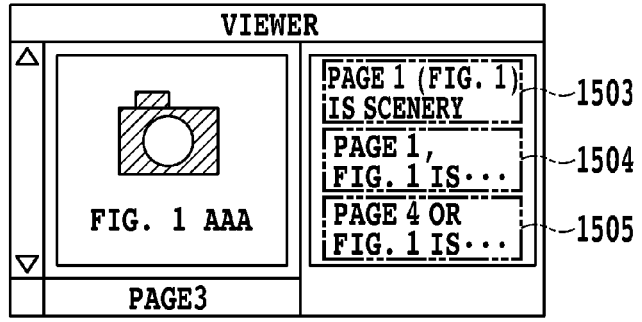

At step S1407, the application references the link identifier included in the information on the "display of the list", and displays, as a list, character information before and after each of the anchor expressions from the character information on the text region associated with the link identifier. For example, when the image peripheral region 1501 shown in FIG. 15C is clicked by the reader, as shown in FIG. 15D, the character information 1503 to 1505 before and after the anchor expression that is a candidate of destination is displayed. The document 1503 includes the character information before and after the anchor expression in the character information on the text region 1208 associated with the link identifier "text_01." The document 1504 includes the character information before and after the anchor expression in the character information on the text region 1208 associated with the link identifier "text_02." The document 1505 includes the character information before and after the anchor expression in the character information on the text region 1213 associated with the link identifier "text_03." The display of the list is not limited to the document; it may be an image such as a thumbnail.

Figure 15E:
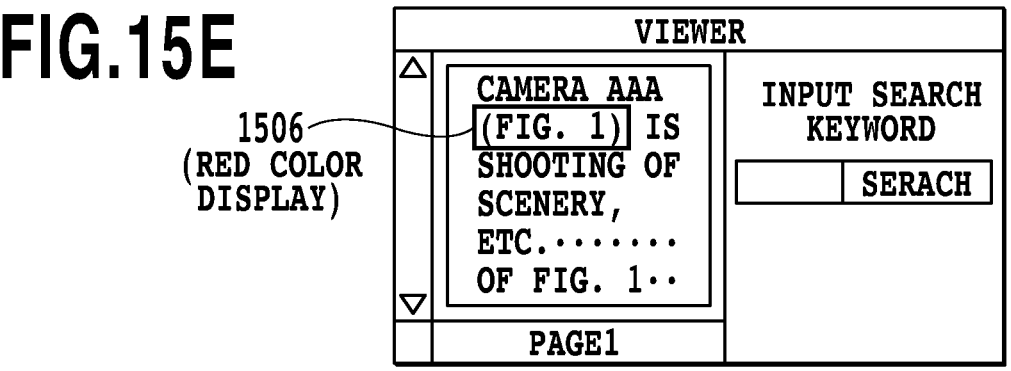
Figure 15F:
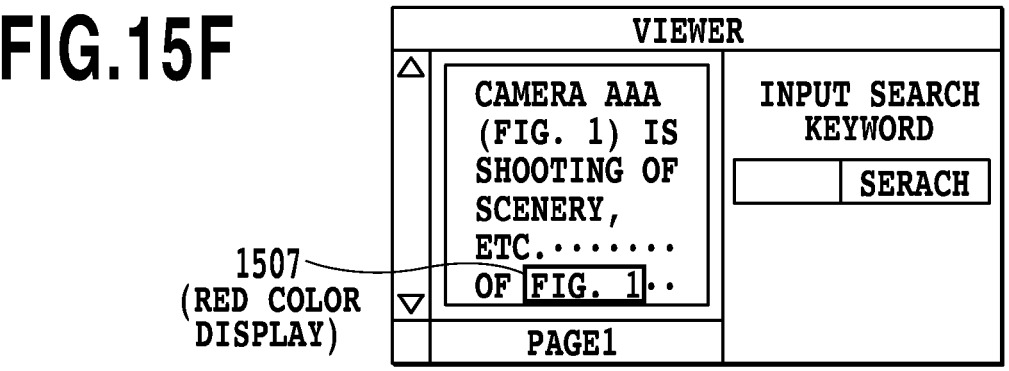
Figure 15G:
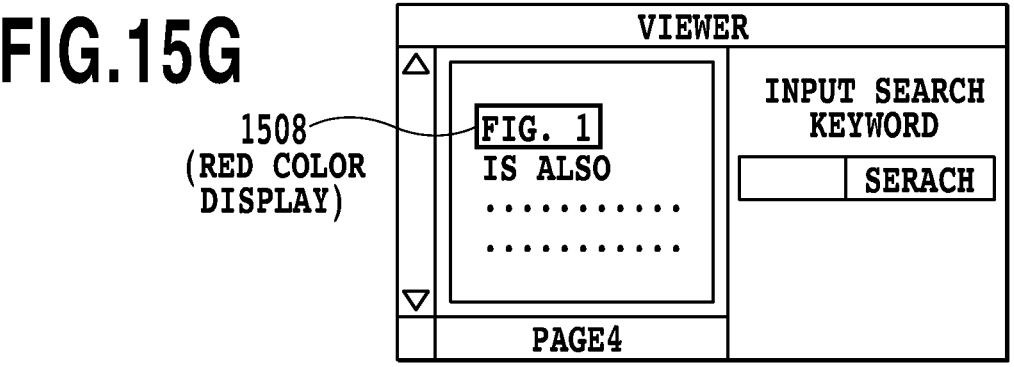
Figure 16A:
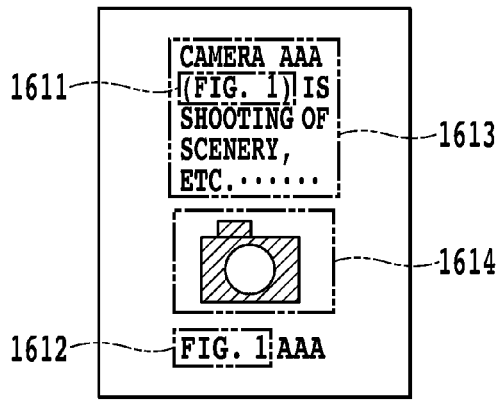
FIG. 16A shows an example of a document.
Figure 16B:
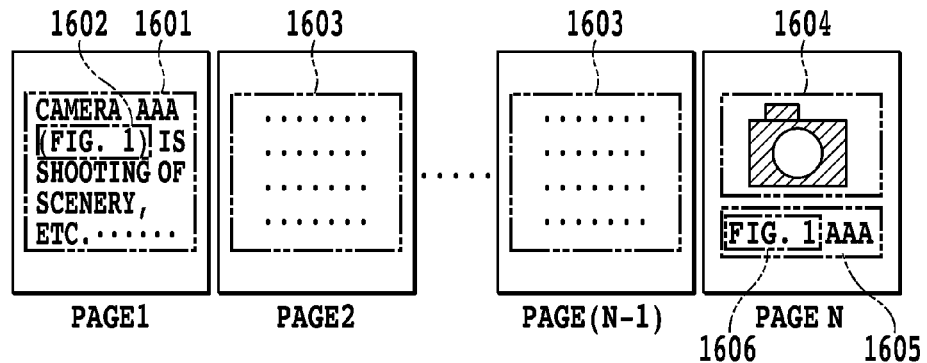
FIG. 16B shows an example of a document composed of N pages.
Figure 16C:
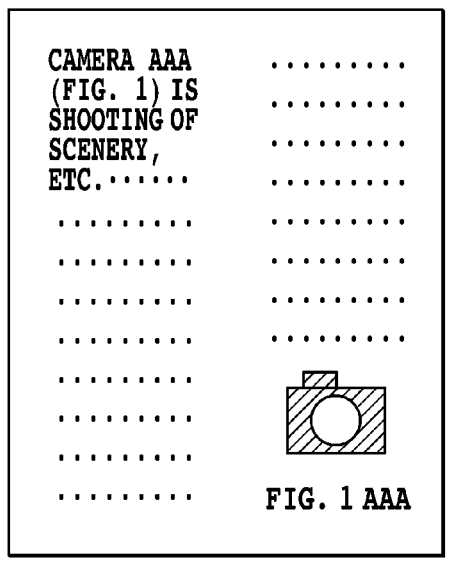
FIG. 16C shows an example of a case where an object and a description text for the object are located apart from each other on the same page.

At step S1409, the application determines whether or not the reader selects the document from the list display displayed at step S1407. If it is selected, the process proceeds to step S1410 whereas if it is not selected, the process is completed. For example, if the document 1503 shown in FIG. 15D is selected, as shown in FIG. 15E, page 1 including the anchor expression associated with the corresponding link identifier is displayed, and the line segment of the outer circumference of the corresponding anchor expression peripheral region 1506 is highlighted in red. If the document 1504 shown in FIG. 15D is selected, as shown in FIG. 15F, page 1 including the anchor expression associated with the corresponding link identifier is displayed, and the line segment of the outer circumference of the corresponding anchor expression peripheral region 1507 is highlighted in red. If the document 1505 shown in FIG. 15D is selected, as shown in FIG. 15E, page 4 including the anchor expression associated with the corresponding link identifier is displayed, and the line segment of the outer circumference of the corresponding anchor expression peripheral region 1508 is highlighted in red.

Although, in the second embodiment described above, steps S1404 and S1405 are explained in this order, the order may be reversed (the determination at step S1405 is first performed, and if the "display of the list" is determined at step S1405, the processing at step S1404 may be performed).

The explanation of FIGS. 14A-14B and 15A-15G has completed.

As described above, the different types of link information are generated depending on whether the number of anchor expressions is one or two or more, and thus the following effects can be obtained. Even when the number of anchor expressions for the "object" is two or more, the reader can move, with a simple operation, from a page having the "object" to a page that is desired by the reader and that has the "description text for the object." Furthermore, since the character information before and after each of the anchor expressions is submitted in a list format, the reader can easily determine and select to which page the reader moves. Furthermore, even when the page of the "description text for the object" to the page of the "object", it is possible to return, with a simple operation, to the page of the "description text for the object" that has been immediately previously seen.

Other Embodiments

The first and second embodiments deal with a case where a paper document including the "object" and the "description text for the object" is scanned by a scanner into image data, this image data is input and electronic document data having two-way link information is produced. However, the document that is input is not limited to a paper document; it may be an electronic document. In other words, an electronic document such as SVG, XPS, PDF or Office Open XML that does not include two-way link information is input, and electronic document data having two-way link information can be produced. Furthermore, when the electronic document that is input already has region information (position, size and attribute) and character information, the processing performed in the region division portion 301, the attribute information addition portion 302 and the character recognition portion 303 is omitted, and thus it is possible to enhance the efficiency of the processing.

Although, in the second embodiment, an example of the candidate display information is the "display of the list", it is not limited to a display in a list format. For example, a "message display" or an "error display" that indicates a plurality of choices of destinations may be used.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-088657, filed Apr. 7, 2010, which is hereby incorporated by reference herein in its entirety.

What is claimed is:

1. An image processing device comprising:
at least one processor and memory, cooperating to function as:
an input unit configured to input document image data;
a region division unit configured to divide the document image data into a plurality of regions according to attributes, the divided regions including a text region, a caption region and an object region which is accompanied by the caption region;
a character recognition unit configured to obtain character information by executing a character recognition process for each character within each of the text region and the caption region divided by said region division unit;
an anchor expression extraction unit configured to extract, from the character information in the caption region, an anchor expression which includes a predetermined character string identifying the object region;
a text search unit configured to search for the anchor expression extracted by said anchor expression extraction unit from the character information in the text region;
a link information generation unit configured to generate two-way link information associating an anchor expression peripheral region and an image peripheral region with each other, the anchor expression peripheral region being a region including the anchor expression found by said text search unit, and the image peripheral region being a region including the object region,
wherein, in a case where said text search unit finds one anchor expression from the character information in the text region, said link information generation unit generates the two-way link information associating the image peripheral region with one anchor expression peripheral region which is a region including the one anchor expression found by said text search unit,
wherein, in a case where said text search unit finds a plurality of anchor expressions from the character information in the text region, said link information generation unit generates the two-way link information associating the image peripheral region with a plurality of anchor expression peripheral regions which are regions including the plurality of the anchor expressions found by said text search unit; and
a format conversion unit configured to generate electronic document data including document image data and the two-way link information,
wherein, in the case where said text search unit finds the one anchor expression from the character information in the text region, the two-way link information includes a first link and a second link, the first link including information for displaying the associated one anchor expression peripheral region when a reader of the electronic document takes a predetermined action on the image peripheral region, and the second link including information for displaying the associated image peripheral region when a reader of the electronic document takes a predetermined action on the one anchor expression peripheral region, and
wherein, in the case where said text search unit finds the plurality of anchor expressions from the character information in the text region, the two-way link information includes a third link and a fourth link, the third link including information for displaying information about the plurality of the anchor expression peripheral regions as a plurality of candidates of link destinations from the image peripheral region when a reader of the electronic document takes a predetermined action on the image peripheral region, and the fourth link including information for displaying the associated image peripheral region when a reader of the electronic document takes a predetermined action on any one of the plurality of the anchor expression peripheral regions.

2. The image processing device of claim 1, wherein, in the case where said text search unit finds the plurality of the anchor expressions, the two-way link information further includes information for displaying a message which indicates a presence of a plurality of the anchor expressions when a reader of the electronic document takes a predetermined action on the image peripheral region.

3. The image processing device of claim 1, wherein the object region includes at least one of regions of a table, a line figure and a photograph.

4. The image processing device of claim 1, wherein said anchor expression extraction unit extracts a character string of a figure number as the anchor expression.

5. The image processing device of claim 1, wherein a file format of the electronic document data is a file format on SVG, XPS, PDF and Office Open XML.

6. The image processing device of claim 1, wherein the third link includes information for displaying a list about the plurality of the anchor expression peripheral regions as the plurality of candidates of link destinations from the image peripheral region when the reader of the electronic document takes the predetermined action on the image peripheral region, so that the reader can select which of the anchor expression peripheral regions is displayed.

7. The image processing device of claim 1, wherein the document image data included in the generated electronic document data is data that is obtained by executing at least one of vector conversion processing and image compress processing.

8. An electronic image display system comprising an electronic document display device and an image processing device,
said image processing device comprising at least one processor and memory cooperating to function as:
an input unit configured to input document image data;
a region division unit configured to divide the document image data into a plurality of regions according to attributes, the divided regions including a text region, a caption region and an object region which is accompanied by the caption region;

a character recognition unit configured to obtain character information by executing character recognition process for each character within each of the text region and the caption region divided by said region division unit;

an anchor expression extraction unit configured to extract, from the character information in the caption region, an anchor expression which includes a predetermined character string identifying the object region;

a text search unit configured to search for the anchor expression extracted by said anchor expression extraction unit from the character information in the text region;

a link information generation unit configured to generate, in a case where said text search unit finds a plurality of the anchor expressions in the text region, two-way link information associating an image peripheral region with a plurality of anchor expression peripheral regions, the plurality of anchor expression peripheral regions being regions including the plurality of the anchor expressions found by said text search unit, the image peripheral region being a region including the object region, wherein the two-way link information includes candidate display information for displaying information about the plurality of the anchor expression peripheral regions as a plurality of candidates of link destinations from the image peripheral region when a reader of the electronic document takes a predetermined action on the image peripheral region; and a format conversion unit configured to generate electronic document data including document image data and the two-way link information which includes the candidate display information, and said electronic document display device comprising at least one processor and memory, cooperating to function as:

a first display unit configured to display the document image data included in the electronic document data generated by said format conversion unit;

a position information holding unit configured to hold, when a user selects one of the anchor expression peripheral regions on the document image data displayed by said first display unit, a position of the selected one of anchor expression peripheral regions as position information; and a second display unit configured to determine, when the user selects the image peripheral region, whether or not the position information is held by said position information holding unit, and to display, in a case where it is determined that the position information is held by said position information holding unit, the anchor expression peripheral region corresponding to the held position information, and to display, in a case where it is determined that the position information is not held by said position information holding unit, the plurality of the candidates of link destinations based on the candidate display information for user selection of one of the displayed plurality of the candidates of link destinations.

9. An image processing method comprising:

an input step of inputting document image data;

a region division step of dividing the document image data into a plurality of regions according to attributes, the divided regions including a text region, a caption region and an object region which is accompanied by the caption region;

a character recognition step of obtaining character information by executing a character recognition process for each character within each of the text region and the caption region divided in said region division step;

an anchor expression extraction step of extracting, from the character information in the caption region, an anchor expression which includes a predetermined character string identifying the object region;

a text search step of searching for the anchor expression extracted in said anchor expression extracting step from the character information in the text region;

a link information generation step of generating two-way link information that associates an anchor expression peripheral region and an image peripheral region with each other, the anchor expression peripheral region being a region including the anchor expression found in said text search step, and the image peripheral region being a region including the object region, wherein, in a case of finding one anchor expression from the character information in the text region in said text search step, said link information generation step allows generation of the two-way link information associating the image peripheral region with one anchor expression peripheral region which is a region including the one anchor expression found in said text search step, wherein, in a case of finding a plurality of anchor expressions from the character information in the text region in said text search step, said link information generation step allows generation of the two-way link information associating the image peripheral region with a plurality of anchor expression peripheral regions which are regions including the plurality of the anchor expressions found in said text search step; and a format conversion step of generating electronic document data including the document image data and the two-way link information, wherein, in the case of finding the one anchor expression from the character information in the text region in said text search step, the two-way link information includes a first link and a second link, the first link including information for displaying the associated one anchor expression peripheral region when a reader of the electronic document takes a predetermined action on the image peripheral region, and the second link including information for displaying the associated image peripheral region when a reader of the electronic document takes a predetermined action on the one anchor expression peripheral region, and wherein, in the case of finding the plurality of anchor expressions from the character information in the text region in said text search step, the two-way link information includes a third link and a fourth link, the third link including information for displaying information about the plurality of the anchor expression peripheral regions as a plurality of candidates of link destinations from the image peripheral region when a reader of the electronic document takes a predetermined action on the image peripheral region, and the fourth link including information for displaying the associated image peripheral region when a reader of the electronic document takes a predetermined action on any one of the plurality of the anchor expression peripheral regions.

10. A non-transitory computer-readable storage medium storing an executable program for causing a computer to execute:

an input step of inputting document image data;

a region division step of dividing the document image data into a plurality of regions according to attributes, the divided regions including a text region, a caption region and an object region which is accompanied by the caption region;

a character recognition step of obtaining character information by executing a character recognition process for each character within each of the text region and the caption region divided in said region division step;

an anchor expression extraction step of extracting, from the character information in the caption region, an anchor expression which includes a predetermined character string identifying the object region;

a text search step of searching for the anchor expression extracted in said anchor expression extracting step from the character information in the text region;

a link information generation step of generating two-way link information that associates an anchor expression peripheral region and an image peripheral region with each other, the anchor expression peripheral region being a region including the anchor expression found in said text search step, and the image peripheral region being a region including the object region;

wherein, in a case of finding one anchor expression from the character information in the text region in said text search step, said link information generation step allows generation of the two-way link information associating the image peripheral region with one anchor expression peripheral region which is a region including the one anchor expression found in said text search step, wherein, in a case of finding a plurality of anchor expressions from the character information in the text region in said text search step, said link information generation step allows generation of the two-way link information associating the image peripheral region with a plurality of anchor expression peripheral regions which are regions including the plurality of the anchor expressions found in said text search step; and a format conversion step of generating electronic document data including the document image data and the two-way link information, wherein, in the case of finding the one anchor expression from the character information in the text region in said text search step, the two-way link information includes a first link and a second link, the first link including information for displaying the associated one anchor expression peripheral region when a reader of the electronic document takes a predetermined action on the image peripheral region, and the second link including information for displaying the associated image peripheral region when a reader of the electronic document takes a predetermined action on the one anchor expression peripheral region, and wherein, in the case of finding the plurality of anchor expressions from the character information in the text region in said text search step, the two-way link information includes a third link and a fourth link, the third link including information for displaying information about the plurality of the anchor expression peripheral regions as a plurality of candidates of link destinations from the image peripheral region when a reader of the electronic document takes a predetermined action on the image peripheral region, and the fourth link including information for displaying the associated image peripheral region when a reader of the electronic document takes a predetermined action on any one of the plurality of the anchor expression peripheral regions.

* * * * *